(12) United States Patent
Lee

(10) Patent No.: US 12,275,207 B2
(45) Date of Patent: Apr. 15, 2025

(54) METHOD FOR PRODUCING LONG-FIBER COMPOSITE

(71) Applicant: SOONCHUNHYANG UNIVERSITY INDUSTRY ACADEMY COOPERATION FOUNDATION, Chungcheongnam-do (KR)

(72) Inventor: Jae Shik Lee, Cheongju-si (KR)

(73) Assignee: SOONCHUNHYANG UNIVERSITY INDUSTRY ACADEMY COOPERATION FOUNDATION, Asan-si (KR)

(*) Notice: Subject to any disclaimer, the term of this patent is extended or adjusted under 35 U.S.C. 154(b) by 80 days.

(21) Appl. No.: 17/627,922

(22) PCT Filed: Jul. 16, 2020

(86) PCT No.: PCT/KR2020/009396
§ 371 (c)(1),
(2) Date: Jan. 18, 2022

(87) PCT Pub. No.: WO2021/010775
PCT Pub. Date: Jan. 21, 2021

(65) Prior Publication Data
US 2022/0266551 A1    Aug. 25, 2022

(30) Foreign Application Priority Data
Jul. 18, 2019 (KR) .................. 10-2019-0086702

(51) Int. Cl.
B29C 70/00    (2006.01)
B29B 15/00    (2006.01)
(Continued)

(52) U.S. Cl.
CPC .......... B29C 70/682 (2013.01); B29C 70/504 (2013.01); B29C 70/54 (2013.01); B29K 2105/04 (2013.01); B29K 2105/10 (2013.01)

(58) Field of Classification Search
None
See application file for complete search history.

(56) References Cited

U.S. PATENT DOCUMENTS 1,986,319 A  *  1/1935  Bongrand ............. D06M 15/09
                                                              15/159.1
3,908,042 A  *  9/1975  Heissler .................. B65H 49/18
                                                              427/175
(Continued)

FOREIGN PATENT DOCUMENTS

CN    102729483 A    10/2012
CN    102958657 A    3/2013
(Continued)

OTHER PUBLICATIONS

KR-20090069682 (Yong) Jul. 2009 (online machine translation), [Retrieved on Oct. 23, 2023]. Retrieved from: Espacenet (Year: 2009).*

(Continued)

Primary Examiner — Alison L Hindenlang
Assistant Examiner — Andres E. Behrens, Jr.
(74) Attorney, Agent, or Firm — Sughrue Mion, PLLC

(57) ABSTRACT

The present invention pertains to a method for producing a long-fiber composite in which a fiber bundle is impregnated with a non-Newtonian resin. More specifically, the present invention pertains to a method for producing a thermoplastic long-fiber composite, wherein the efficiency of a non-Newtonian resin impregnation process is improved using Equation 1 representing the correlation between the penetration pressure, effective viscosity, transverse permeability, and (Continued)

average penetration velocity of the non-Newtonian resin, and the thickness of the fiber bundle.

12 Claims, 4 Drawing Sheets

(51) Int. Cl.
    *B29C 70/28*     (2006.01)
    *B29C 70/50*     (2006.01)
    *B29C 70/52*     (2006.01)
    *B29C 70/54*     (2006.01)
    *B29C 70/68*     (2006.01)
    *B29C 70/78*     (2006.01)
    *C08J 5/00*     (2006.01)
    *C08J 5/10*     (2006.01)
    *B29K 105/04*     (2006.01)
    *B29K 105/10*     (2006.01)

(56) References Cited

U.S. PATENT DOCUMENTS

| | | | | |
|---|---|---|---|---|
| 5,607,531 | A | * | 3/1997 | Needham ................ B29B 15/14 156/166 |
| 5,783,013 | A | * | 7/1998 | Beckman ............. B29C 70/523 156/433 |
| 2012/0251823 | A1 | * | 10/2012 | Maldonado ............ B29C 43/28 428/394 |
| 2013/0115412 | A1 | * | 5/2013 | Padmanabhan ....... B29C 70/521 428/113 |
| 2018/0043602 | A1 | * | 2/2018 | Uchigata ................. C08L 63/00 |
| 2019/0184606 | A1 | | 6/2019 | Huang et al. |
| 2022/0134688 | A1 | * | 5/2022 | Sato ..................... B29C 70/504 264/136 |

FOREIGN PATENT DOCUMENTS

| | | | | |
|---|---|---|---|---|
| EP | 2 329 937 A1 | | 6/2011 | |
| EP | 3 338 979 A1 | | 6/2018 | |
| JP | H-06254854 A | * | 9/1994 | ............ B29B 11/16 |
| JP | H-06254857 A | * | 9/1994 | |
| JP | H-06254976 A | * | 9/1994 | |
| JP | 11-99519 A | | 4/1999 | |
| JP | 2005-263828 A | | 9/2005 | |
| JP | 2006-334876 A | | 12/2006 | |
| JP | 2010-264680 A | | 11/2010 | |
| JP | 2012-110935 A | | 6/2012 | |
| JP | 2015-507650 A | | 3/2015 | |
| JP | 2018-090825 A | | 6/2018 | |
| JP | 2018090825 | * | 6/2018 | |
| KR | 2009/0069682 | * | 7/2009 | |
| KR | 2009-0069682 A | | 7/2009 | |
| KR | 2012-0116519 A | | 10/2012 | |
| KR | 2017-0126928 A | | 11/2017 | |
| WO | 2013/038521 A1 | | 3/2013 | |

OTHER PUBLICATIONS

JP-2018090825 (Masanori) Jun. 2018 (online machine translation), [Retrieved on Oct. 23, 2023]. Retrieved from: Espacenet (Year: 2018).*
Wikipedia. "Polypropylene." Wikipedia, Jun. 24, 2019, web.archive. org/web/20190710231338/https://en.wikipedia.org/wiki/Polypropylene. (Year: 2019).*
JPH-06254854A (Kadowaki) Sep. 1994 (online machine translation), [Retrieved on Apr. 12, 2024]. Retrieved from: Espacenet (Year: 1994).*
Office Action issued Jan. 26, 2024 in Chinese Application No. 202080065812.8.
Communication dated Aug. 29, 2023 issued by the Japanese Patent Office in application No. 2022-502999.
International Patent Application No. PCT/KR2020/009396; Int'l Written Opinion and Search Report; dated Oct. 23, 2020; 7 pages.

* cited by examiner

METHOD FOR PRODUCING LONG-FIBER COMPOSITE

BACKGROUND OF THE DISCLOSURE

Field of the Disclosure

The present disclosure relates to a method for manufacturing a long fiber composite, and to a method for manufacturing a long fiber composite in which a fiber bundle is impregnated with a resin.

Further, the present disclosure relates to a method for manufacturing a thermoplastic long fiber composite in which a fiber bundle is impregnated with a non-Newtonian resin.

Further, the present disclosure relates to a method for manufacturing a thermoplastic long fiber composite, which improves the impregnation process efficiency of the non-Newtonian resin using Equation 1 representing the correlation between the penetration pressure, effective viscosity, degree of vertical penetration, and average penetration rate of the non-Newtonian resin, and the thickness of the fiber bundle.

Related Art

As the demand for high-stiffness and lightweight materials in the industrial field increases due to high oil prices, interest in continuous fiber-reinforced polymer composite materials is increasing. In the case of thermosetting resins, because of their low viscosity, the degree of impregnation of intermediate materials and finished products is excellent, and mass production is possible due to a relatively fast impregnation rate so that a lot of research and product production have been conducted in the past. However, there have been disadvantages in that recycling was difficult and the curing cycle of the resin was long. Meanwhile, as global interest in eco-friendliness increases and it is urgent to secure price competitiveness based on the global market, interest in thermoplastic polymer composite materials with advantages of recycling and shortening of process time is being more concentrated. However, in the case of a thermoplastic resin, since the melt viscosity is very high, the time required for impregnation is increased so that productivity is lowered, and due to this, it is inevitable to consider the problem of loss of price competitiveness of the product.

In thermoplastic resin polymer composite materials, the production of products using a short fiber-reinforced thermoplastic polymer composite material (Short Fiber Thermoplastic, SFT) and a long fiber-reinforced thermoplastic polymer composite material (Long Fiber Thermoplastic, LFT) has been a major part of the industry. However, the preference for continuous fiber reinforced thermoplastic polymer composite materials is increasing according to changes in the market preference that considers higher levels of high rigidity, light weight, price competitiveness, and eco-friendliness at the same time, and increasing productivity through improvement in manufacturing process efficiency thereof is emerging as a major concern.

Meanwhile, the process of attaching the resin to the fiber bundle and penetrating it to the inside of the fiber bundle is called the impregnation process, and it is extremely difficult to manufacture a resin-impregnated fiber bundle that achieves a desired manufacturing time only by attaching the resin and expecting penetration by capillary phenomenon. Accordingly, research for improving the impregnation properties that penetrate the resin into the fiber bundle is being conducted.

As a conventional art, Japanese Patent Laid-Open Publication No. Showa 60-240435 disclosed a method for manufacturing a resin-impregnated fiber bundle by maintaining all of the manufacturing apparatuses in a reduced pressure space.

SUMMARY

It is an object of the present disclosure to provide a method for manufacturing along fiber composite in which a fiber bundle is impregnated with a resin.

Further, the present disclosure relates to a method for manufacturing a thermoplastic long fiber composite, which improves the impregnation process efficiency of the non-Newtonian resin using Equation 1 representing the correlation between the penetration pressure, effective viscosity, transverse permeability, and average penetration rate of the non-Newtonian resin, and the thickness of the fiber bundle.

In order to achieve the above object, the manufacturing method of the present disclosure, as a method for manufacturing a long fiber composite using an apparatus for manufacturing a long fiber composite, the apparatus including a container for containing a resin, a roller which is disposed inside the container and rotates in one direction, a draw-out part for applying tension to a fiber bundle and moving the fiber bundle in one direction, and a resin supply part for supplying the resin into the container, comprises the steps of: a supply step of supplying the resin into the container at a preset pressure by the resin supply part:

a moving step of moving the fiber bundle in one direction by the draw-out part; and an impregnation step of penetrating the resin supplied into the container into the fiber bundle, wherein the impregnation step is characterized in that it is controlled according to Equation 1 below.

$$V_0^n = \frac{K_y}{\mu_{eff}} \frac{\Delta P}{L} \quad \text{[Equation 1]}$$

($V_o$: Average velocity of the resin penetrated into the fiber bundle, n: Power-law index of the resin, $K_y$: transverse permeability, $\mu_{eff}$: Effective viscosity, $\Delta P$: Penetration pressure of the resin into the fiber bundle, and L: Thickness of the fiber bundle).

The manufacturing method of the present disclosure can predict in advance the degree of impregnation according to processing conditions such as the type and processing form of the fiber bundle, the type of resin, etc., thereby enabling processing conditions of the fiber bundle and the resin to be set so that impregnation is completely performed within a preset time.

Further, a relatively simple process method, that is, a method of controlling the supply pressure of the resin or controlling the porosity of the fiber bundle, can improve the impregnation efficiency.

DESCRIPTION OF EXEMPLARY EMBODIMENTS

Figure 1:
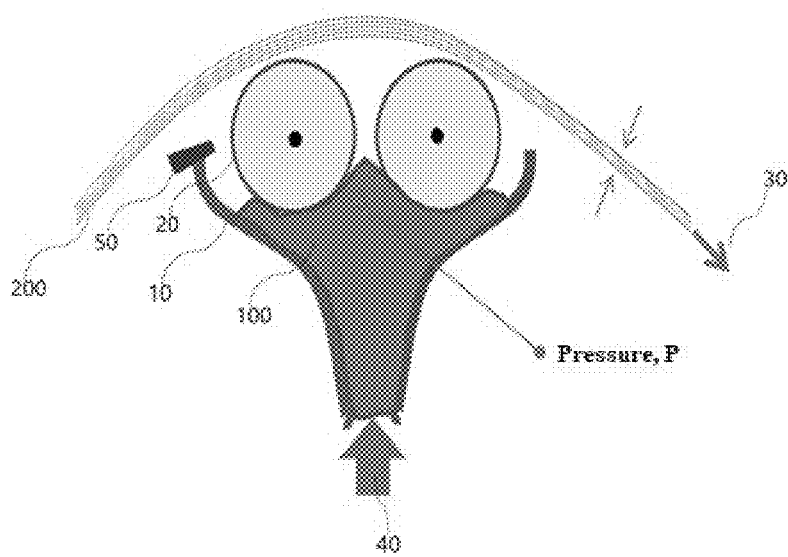
FIG. 1 is a schematic view showing a part of an apparatus for manufacturing a long fiber composite according to an embodiment of the present disclosure.

Hereinafter, preferred embodiments of the present disclosure will be described as follows with reference to the accompanying drawings. However, the embodiments of the present disclosure may be modified in various other forms, and the scope of the present disclosure is not limited to the embodiments described below. Further, the embodiments of the present disclosure are provided in order to more completely explain the present disclosure to those with ordinary skill in the art. Accordingly, the shapes, sizes, etc. of elements in the drawings may be exaggerated for clearer description, and elements indicated by the same reference numerals in the drawings are the same elements. Further, the same reference numerals are used throughout the drawings for parts having similar functions and actions. In addition, "including" a prescribed element throughout the specification means that another element may be further included, rather than excluding other elements, unless any particularly opposite description exists.

A method for manufacturing a long fiber composite according to an embodiment of the present disclosure is a method for manufacturing a long fiber composite formed by impregnating a resin in a fiber bundle, and may be a method for manufacturing a long fiber composite by impregnating the fiber bundle with a thermoplastic resin having a property of being melted particularly when heat is applied.

Accordingly, the long fiber composite according to an embodiment of the present disclosure may be a thermoplastic long fiber composite.

The term 'fiber bundle' in the present specification refers to a fiber bundle in which hundreds to tens of thousands of fiber units having an average diameter ($D_f$) of several to tens of micrometers (μm) are bundled.

The fiber bundle may be at least one of glass fiber filaments, carbon fiber filaments, basalt fiber filaments, aramid fiber filaments, spectra fiber filaments, natural fiber filaments, and mixed filaments thereof.

The method for manufacturing the long fiber composite according to an embodiment of the present disclosure,
as a method for manufacturing a long fiber composite using an apparatus for manufacturing a long fiber composite, the apparatus including a container for containing a resin, a roller which is disposed inside the container and rotates in one direction, a draw-out part for applying tension to a fiber bundle and moving the fiber bundle in one direction, and a resin supply part for supplying the resin into the container,
comprises the steps of: a supply step of supplying the resin into the container at a preset pressure by the resin supply part;
a moving step of moving the fiber bundle in one direction by the draw-out part; and
an impregnation step of penetrating the resin supplied into the container into the fiber bundle, wherein the impregnation step may be controlled according to Equation 1 below.

$$V_0^n = \frac{K_y}{\mu_{eff}} \frac{\Delta P}{L} \quad [\text{Equation 1}]$$

($V_o$: Average velocity of the resin penetrated into the fiber bundle, n: Power-law index of the resin, $K_y$: transverse permeability, $\mu_{eff}$: Effective viscosity, $\Delta P$: Penetration pressure of the resin into the fiber bundle, and L: Thickness of the fiber bundle).

FIG. 1 is a schematic view showing a part of an apparatus for manufacturing a long fiber composite according to an embodiment of the present disclosure. As shown in FIG. 1, the apparatus for manufacturing a long fiber composite according to an embodiment of the present disclosure may include a container 10 for containing a resin, a roller 20 which is disposed inside the container and rotates in one direction, a draw-out part 30 for applying tension to a fiber bundle 200 and moving the fiber bundle 200 in one direction, and a resin supply part 40 for supplying the resin 100 into the container.

Hereinafter, the method for manufacturing the long fiber composite according to an embodiment of the present disclosure will be described in detail for each step.

The supply step is a step of supplying the resin 100 into the container 10 at a preset pressure by the resin supply part 40.

As shown in FIG. 1, the container 10 may be a container which is connected to the resin supply part 40 to receive the resin supplied from the resin supply part 40, and of which upper and lower portions are opened in order to penetrate the received resin into the fiber bundle.

The resin supply part 40 may be connected to the inlet of the container 10 having a narrow inlet at the lower portion thereof as shown in FIG. 1, thereby enabling the resin 100 to be supplied into the container through the inlet.

At this time, it may be preferable that the resin supply part 40 supplies the resin 100 into the container 10 at a pressure of 0.3 to 5.5 atmospheric pressure (atm).

This is for penetrating the resin 100 into the fiber bundle 200, and if the pressure is less than 0.3 atm, there may be a problem in that the resin does not penetrate into the fiber bundle, and if the pressure exceeds 5.5 atm, there may be a problem in that it is very difficult to move the fiber bundle in the penetration process of the resin.

The resin 100 may be at least one of a thermoplastic resin, a thermoplastic resin exhibiting thermoplastic properties at 50 to 500° C., a non-Newtonian resin, a power-law non-Newtonian resin showing a power-law non-Newton at room temperature, and mixtures thereof.

The resin 100 may be a non-Newtonian resin having a Power-law index of 0.25 to 0.92.

Here, non-Newtonian resin refers to a resin having a non-Newtonian property, that is, a property of changing viscosity depending on shear rate, and may be the same as non-Newtonian fluids. In the case of a Newtonian fluid, the properties or flow of the fluid are constantly maintained regardless of the external load, but the viscosity may be expressed as a function of temperature and pressure only, and such a Newtonian fluid may be a fluid having a property of maintaining a constant viscosity even when the shear rate is changed.

The non-Newtonian resin may be a power-law non-Newtonian resin.

Power-law non-Newtonian resin may mean a non-Newtonian resin in which the viscosity of the resin according to the shear rate is expressed by parameters of the Power-law index and the zero-shear rate viscosity.

Most resins such as polymer plastics exhibit shear thinning behavior, that is, a behavior in which the resin viscosity decreases as the shear rate increases. The Power-law index is an index expressed by numerically expressing the shear thinning behavior as described above, and has a value between 0 and 1. At this time, the greater the degree of decrease in resin viscosity compared to the shear rate, the closer to 0 it is, and conversely, the weaker the degree of decrease in resin viscosity compared to the shear rate, the closer to 1 it is. For example, a polypropylene resin having a severe shear thinning behavior has a Power-law index of near 0.3 to 0.4, and a polycarbonate resin having a weak shear thinning behavior has a Power-law index of near 0.9.

The non-Newtonian resin is a non-Newtonian resin that exhibits affinity with the surface of the fiber bundle, and may comprise at least one of maleic anhydride, acrylic acid, amine, ester, epoxy, and compounds to which these are chemically bonded.

Further, the non-Newtonian resin is a non-Newtonian resin showing affinity with the surface of the fiber bundle, and may include at least one of a polypropylene-based resin, a nylon-based resin, a polyethylene-based resin, a polybutylene terephthalate resin, a polyethylene terephthalate resin, a polyvinyl chloride resin, and mixed resins thereof.

The polypropylene-based resin may include at least one of homopolypropylene, propylene ethylene block copolymer polypropylene, propylene ethylene random copolymer polypropylene, and metallocene polypropylene, preferably in an amount of 40% by weight or more.

The polyethylene-based resin may include at least one of high-density polyethylene, low-density polyethylene, linear low-density polyethylene, metallocene polyethylene, and ethylene-based elastomer, preferably in an amount of 40% by weight or more.

The nylon-based resin is a resin containing an amide component, and may be at least one of nylon 6, nylon 66, nylon 12, nylon 46, polyphthalamide, amorphous nylon, and mixed resins thereof.

The moving step is a step of moving the fiber bundle 200 in one direction by the draw-out part 30.

In the method for manufacturing the long fiber composite according to an embodiment of the present disclosure, the fiber bundle 200 is moved in one direction or both directions, and the resin is penetrated into the fiber bundle.

Figure 2:
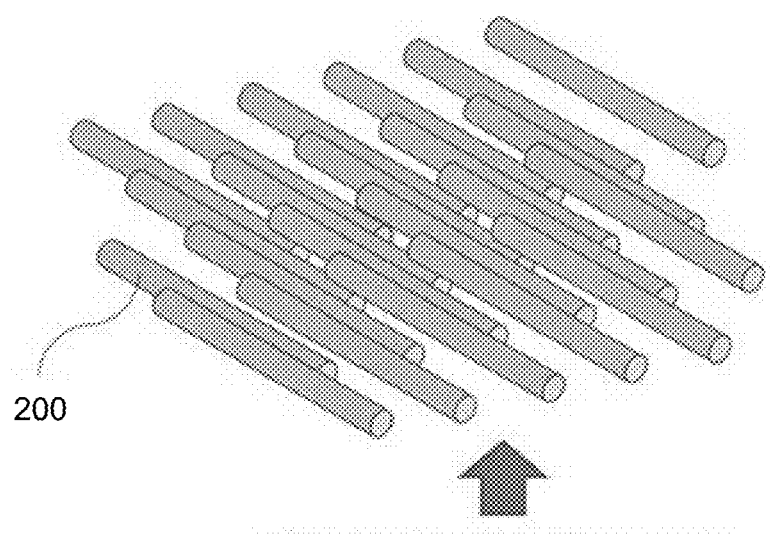
FIGS. 2 and 3 are schematic views showing a fiber unit according to an embodiment of the present disclosure.
Figure 3:
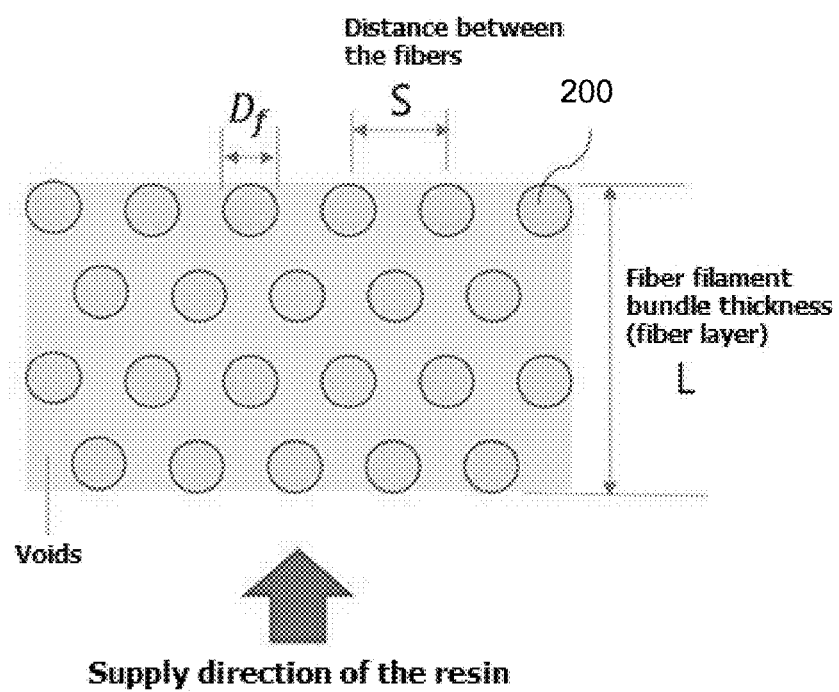

In the fiber bundle 200, when the distance between one surface of the fiber bundle 200 and the other surface thereof is referred to as a thickness, the distance between one end and the other end of the fiber bundle in a direction perpendicular to the movement direction of the fiber bundle 200 in the above description is referred to as a width, and the distance from one end to the other end of the fiber bundle in a direction parallel to the direction in which the fiber bundle 200 moves is referred to as a length, as shown in FIGS. 2 and 3, the fiber bundle 200 may comprise a plurality of fiber units aligned in the width direction or a plurality of fiber units aligned in the longitudinal direction as shown in FIG. 2. While the fiber bundle 200 is moving in the longitudinal direction, the resin 100 may permeate in the thickness direction of the fiber bundle 200.

The draw-out part 30 may apply tension to the fiber bundle and move the fiber bundle in one direction, and the tension may be applied in a direction in which the fiber bundle is moved by the draw-out part.

The impregnation step is a step of penetrating the resin supplied into the container into the fiber bundle.

The impregnation step may be a step of filling the resin 100 in voids of the fiber bundle 200.

The fiber bundle 200 may have porosity by including voids between the plurality of fiber units. Accordingly, the fiber bundle 200 may be fibrous porous media having a plurality of voids therein, and the impregnation step may be a step in which the resin 100 penetrates into the fiber bundle and fills the voids of the fiber bundle 200.

The impregnation step may be controlled according to Equation 1 below.

$$V_0^n = \frac{K_y}{\mu_{eff}} \frac{\Delta P}{L} \quad \text{[Equation 1]}$$

($V_o$: Average velocity of the resin penetrated into the fiber bundle, n: Power-law index of the resin, $K_y$: transverse permeability, $\mu_{eff}$: Effective viscosity, $\Delta P$: Penetration pressure of the resin into the fiber bundle, and L: Thickness of the fiber bundle).

Equation 1 above shows the correlation between the penetration pressure ($\Delta P$), the effective viscosity ($\mu_{eff}$), transverse permeability ($K_y$) and the average velocity of the resin penetrated into the fiber bundle ($V_o$) of the resin, and the thickness (L) of the fiber bundle.

At this time, the resin may preferably be thermoplastic resins having an effective viscosity, non-Newtonian resins, or non-Newtonian fluids.

The effective viscosity is a viscosity expressed by Power-law index indicating the shear thinning behavior of thermoplastic resins, non-Newtonian resins, or non-Newtonian fluids, and may be calculated by Equation 2 below.

$$\mu_{eff} = \mu_0 \left( \frac{\left(4\sqrt{\frac{\Phi_{max}}{\Phi}} - 1\right) f(\Phi)}{D_f} \right)^{n-1} \quad \text{[Equation 2]}$$

$$f(\Phi) = A\left(\frac{\Phi_{max}}{\Phi} - 1\right)^B$$

($\mu_o$: zero-shear rate viscosity of the resin, $\Phi_{max}/\Phi$: relative volume fraction of the fiber bundle, f($\varphi$): fitting parameter)

Figure 4:
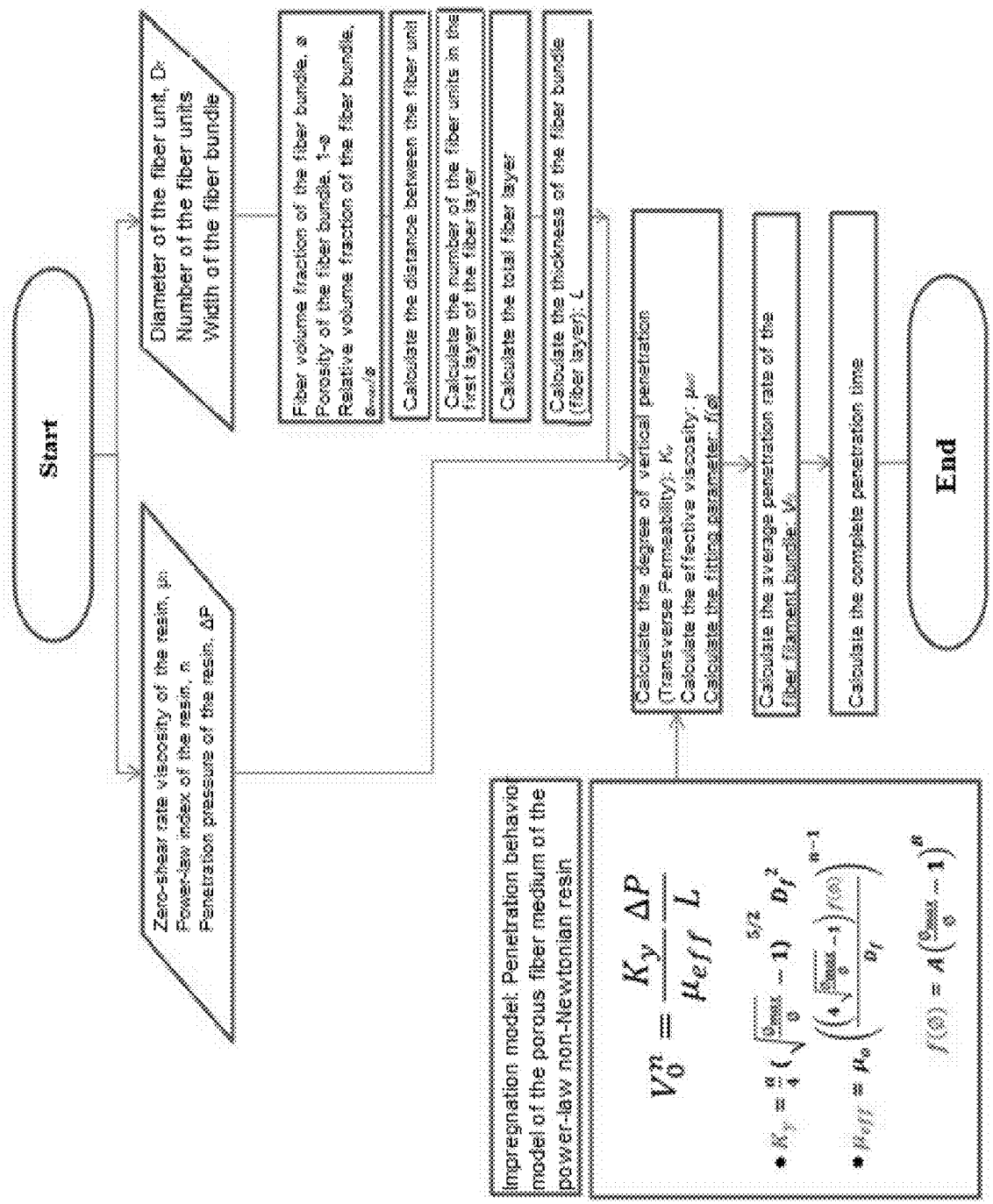
FIG. 4 is an algorithm showing a method for manufacturing a long fiber composite according to an embodiment of the present disclosure.

The impregnation step may be controlled by the algorithm of FIG. 4. The algorithm of FIG. 4 may also be performed in the steps below.

FIG. 4 is an algorithm showing a method for manufacturing a long fiber composite according to an embodiment of the present disclosure.

First, as a first step, the diameter ($D_f$) and number of fiber units included in the fiber bundle, and the width of the fiber bundle may be set, the type of resin may be selected to set zero-shear rate viscosity ($\mu_0$) and resin's Power-law index (n), and the penetration pressure ($\Delta P$) of the resin may be set as the processing conditions.

At this time, the diameter ($D_f$) of the fiber units may preferably have a size of 5 to 100 μm.

If the diameter ($D_f$) of the fiber units is less than 5 μm, there may be a problem in that the impregnation property is lowered in the step of impregnating a long fiber comprising the fiber units, and if the diameter ($D_f$) of the fiber units exceeds 100 μm, there may be a problem in that the mechanical properties of a final product to be manufactured, that is, a long fiber composite, are deteriorated.

The width of the fiber bundle may be preferably 10 to 30 mm, more preferably 12 to 24 mm.

If the width of the fiber bundle is less than 10 mm, there may be problem in that resin impregnation is difficult, and if the width of the fiber bundle exceeds 30 mm, there may be a problem in that friction due to the speed difference between the fiber units is excessively generated.

The zero-shear rate viscosity means a viscosity of the resin at a shear rate of 0.

The resin may be a non-Newtonian resin having a zero-shear rate viscosity of 1 to 300 Pa·s.

If the zero-shear rate viscosity is less than 1 Pa·s, there may be a problem in that mechanical properties are lowered due to too low molecular weight, and if the zero-shear rate viscosity exceeds 300 Pa·s, there may be a problem in that resin impregnation is very difficult since the viscosity is too high.

Further, the resin may preferably be anon-Newtonian resin having a Power-law index of 0.25 to 0.92.

If the Power-law index is less than 0.25, there may be a problem in that it is difficult to design a polymer and an additive for improving fluidity such as a plasticizer should be excessively mixed, and if the Power-law index exceeds 0.92, there may be a problem in that permeation of the resin is very difficult.

Further, the penetration pressure (ΔP) of the resin may be preferably applying a pressure of 0.3 to 5.5 atmospheric pressure (atm).

If the penetration pressure (ΔP) of the resin is less than 0.3 atm, there may be a problem in that it is very difficult for the resin to penetrate into the fiber bundle, and if the penetration pressure (ΔP) of the resin exceeds 5.5 atm, there may be a problem in that an excessive force is applied to the fiber bundle during the resin penetration process so that movement is very difficult.

In the second step, the porosity of the fiber bundle is set under the set conditions.

The porosity may have a value of 0.1 to 0.9, but the present disclosure is not limited thereto.

The impregnation step according to an embodiment of the present disclosure may comprise a porosity control step of controlling the porosity of the fiber bundle so that a penetration time required for the resin 100 to fill the internal voids of the fiber bundle 200 becomes a preset value or less.

The porosity may be calculated by <Equation 1> below.

The porosity may have a value between 0 and 1, more preferably a value of 0.1 to 0.9.

The fiber volume fraction (Φ) occupied by the fiber units in the fiber bundle may be (1-porosity).

$$\text{Porosity} = \frac{\begin{pmatrix}\text{Total cross-sectional area of the fiber bundle}\end{pmatrix} - \begin{pmatrix}\text{Cross-sectional area of the fiber unit}\end{pmatrix} \times \begin{pmatrix}\text{Number of the fiber units}\end{pmatrix}}{\begin{pmatrix}\text{Total cross-sectional area of the fiber bundle}\end{pmatrix}}$$

[Equation 1]

The porosity may vary depending on the fiber volume content, the distance between the fiber units, and the packing form of the fiber units. The long fiber composite may be manufactured at a high fiber content, and the fiber units may be packed in a hexagonal form.

Further, the distance (S) between the fiber units may be calculated by <Equation 2> below, and if the fiber units are hexagonally packed, the aspect ratio ($S_f$) between the fiber units may be √3.

$$S = \sqrt{\frac{\pi(1+S_f^2)}{2S_f\phi}} \frac{D_f}{2}$$

[Equation 2]

(S: distance between the fiber units, $S_f$: aspect ratio between the fiber units, Φ: fiber volume fraction, $D_f$: diameter of the fiber unit)

The number of fiber units included in the fiber bundle may be calculated by <Equation 3> below.

$$\text{Number of fiber units} = \frac{TEX/1000}{\text{Weight per 1 m of the fiber unit}}$$

[Equation 3]

(TEX: gram weight per 1 km of the fiber bundle)

Weight per m of the fiber unit = cross-sectional area of the fiber unit × fiber density $$\text{Cross - sectional area of the fiber unit} = \frac{\Pi D_f^2}{4}$$

In the fiber bundle, through the number of fiber units included in the fiber bundle calculated by Equation 3 above and the distance (s) between the fiber units, when the fiber bundle is unfolded by fiber volume content, the number of fiber units included in one layer may be known from the unfolded width (W), and the number of fiber unit layers included in the fiber bundle may be known from the number of fiber units that are present in one layer. As such, when the number of the fiber unit layers of the fiber bundle is known, the thickness (L) through which the resin should penetrate may be known.

At this time, the penetration time may be a complete penetration time, which is a time taken to fill all the voids inside the fiber bundle or a time taken to have a porosity of the fiber bundle of 0%.

The porosity of the fiber bundle may mean a volume fraction of voids in the fiber bundle. Accordingly, when the fiber volume fraction occupied by the fiber units in the fiber bundle is 'φ', the porosity has a value of '1−φ'.

For example, if the volume content occupied by the fiber units in the fiber bundle is 40%, the fiber volume fraction may be 0.4 and the porosity may be 0.6.

When the penetration time is within 8 seconds, it may be regarded as a reference time for enabling design of the impregnation die. Accordingly, the preset time is preferably within 8 seconds, more preferably within 7 seconds, and more preferably within 6 seconds.

Here, the reference time for enabling design of the impregnation die may be a continuous manufacturing enabling time in which the fiber bundle is not uneconomical due to a slow line speed, and the stability of the resin is not hindered due to a long residence time in the die. The reference time for enabling design of the impregnation die may vary depending on the line speed of the fiber bundle and the length of the impregnation die.

In penetrating the resin into the fiber bundle, if the impregnation die is lengthened to lengthen the time the fiber bundle is in contact with the resin, it is advantageous for the impregnation, whereas there may be a problem in that a lot of force is required to move the fiber bundle. Accordingly, the penetration time may be controlled by the design of the impregnation die. Therefore, the impregnation die should be designed so that the resin may be completely impregnated into the fiber bundle within the shortest possible time. For example, if the fiber bundle moves at a line speed of 10 m/min and passes through a 1 m-long impregnation die, the resin penetration may occur while it comes into contact with the resin for about 6 seconds.

If the fiber bundle moves slower than a line speed of 10 m/min, there may be a problem in that it is disadvantageous to mass manufacturing, resulting in a decrease in manufacturing productivity, and if the length of the impregnation die becomes longer than 1 m, there may be a problem in that the load applied to the fiber bundle during movement becomes too high so that continuous manufacturing is difficult.

The porosity control step may comprise a step of controlling a distance between the respective fiber units included in the fiber bundle 200.

The step of controlling the distance between the respective fiber units included in the fiber bundle may be performed by a method of applying a force in a direction perpendicular to a direction of applying a tension to the fiber bundle.

Since the direction of applying the tension is a direction parallel to the movement direction, the direction of applying the force to the fiber bundle may be a direction perpendicular to the movement direction.

For example, the distance between a plurality of fiber units aligned in the longitudinal direction may be increased by applying a force in a direction perpendicular to the direction of applying the tension.

At this time, the amount of the resin that comes into contact with the fiber bundle may be adjusted using a resin knife 50. It is possible to control the amount of the resin that comes into contact with the fiber bundle by using the resin knife 50 so that an excessive amount of the resin does not enclose the fiber bundle at one time.

Here, the resin knife is a device for removing the resin pulled up by the rotary roller, and may be a device for adjusting the amount of the rotary roller coating resin, for example, a roll coating adjustment knife.

The apparatus for manufacturing a long fiber composite may further include a resin knife 50 positioned at the fiber bundle injection part of the first roller, and may enables the fiber units included in the unfolded fiber bundle 200 to be partially coated by adjusting the amount of the resin coated on the rotating roller 20 using the resin knife 50, that is, by adjusting the amount of the resin that penetrates into the fiber bundle. The fiber units that have been partially coated through this may be more easily separated so that the distance between the fiber units may be more easily adjusted.

The perpendicular direction in the present specification does not mean only a direction of 90° with respect to the reference direction, but may mean all of the vector components when a vector component with respect to a direction forming 90° with the reference direction exists among the vector components.

Further, the parallel direction does not mean only a direction of 0° or 180° with respect to the reference direction, but may mean all of the vector components when a vector component with respect to a direction forming 0° or 180° with respect to the reference direction exists among the vector components.

For example, the step of controlling the distance between the fiber units may be performed by a method of applying a force in a 45° or 90° direction to the direction of applying a tension to the fiber bundle, or may be performed by a method of applying a force in the thickness direction of the fiber bundle.

In the third step, after calculating the distance (S) between the respective fiber units in the fiber bundle having a specific porosity, the Average velocity ($V_o$) in which the resin penetrates into the fiber bundle may be calculated based on Equation 1 below, and the penetration time of the resin may be calculated therefrom.

$$V_0^n = \frac{K_y}{\mu_{eff}} \frac{\Delta P}{L} \qquad \text{[Equation 1]}$$

($V_o$: Average velocity of the resin penetrated into the fiber bundle, n: Power-law index of the resin, $K_y$: transverse permeability, $\mu_{eff}$: Effective viscosity, $\Delta P$: Penetration pressure of the resin into the fiber bundle, and L: Thickness of the fiber bundle).

In order to calculate the average velocity of the resin penetrated into the fiber bundle ($V_o$) of the fiber bundle, it is preferable to first calculate the effective viscosity ($\mu_{eff}$) and the transverse permeability ($K_y$), and the effective viscosity ($\mu_{eff}$) and the transverse permeability ($K_y$) may be calculated by Equations 2 and 3 below. At this time, A and B in the fitting parameters may vary depending on the packing form between the fiber units.

$$\mu_{eff} = \mu_0 \left( \frac{\left(4\sqrt{\frac{\phi_{max}}{\phi}} - 1\right) f(\phi)}{D_f} \right)^{n-1} \qquad \text{[Equation 2]}$$

$$f(\phi) = A\left(\frac{\phi_{max}}{\phi} - 1\right)^B$$

($\mu_0$: zero-shear rate viscosity of the resin, $\Phi_{max}/\Phi$: relative volume fraction of the fiber bundle, f($\varphi$): fitting parameter, A, B: constants)

$$Ky = \frac{a}{4}\left(\sqrt{\frac{\phi_{max}}{\phi}} - 1\right)^{5/2} D_f^2 \qquad \text{[Equation 3]}$$

$$a = \frac{16}{9\pi\sqrt{6}}, \quad \phi_{max} = \frac{\pi}{2\sqrt{3}}$$

($\Phi_{max}/\Phi$: relative volume fraction of the fiber bundle, $D_f$: diameter of the fiber unit, a: constant)

The effective viscosity refers to a viscosity expressed by Power-law index indicating the shear thinning behavior of thermoplastic resins, non-Newtonian resins, or non-Newtonian fluids, and the transverse permeability ($K_y$) refers to the degree of permeating the resin in the thickness direction of the fiber bundle 200.

The transverse permeability ($K_y$) of the resin may have a larger value as the porosity of the fiber bundle increases.

When the calculated penetration time exceeds a specific value in order to efficiently perform the process, the penetration time may be allowed to become a specific value or less by a method of controlling the porosity of the fiber bundle.

Accordingly, the method for manufacturing a long fiber composite according to an embodiment of the present disclosure may adjust the penetration time to a preset value or less depending on types of the resin and the fiber bundle by an easier method of controlling the porosity of the fiber bundle.

Meanwhile, in the impregnation step, the resin 100 supplied to the container 10 may pass through between a plurality of rollers 20 to penetrate into the fiber bundle 200.

At this time, the roller may include a first roller and a second roller spaced apart from each other, and the resin 100 supplied into the container 10 may pass through between the first roller and the second roller to penetrate into the fiber bundle by a preset pressure.

Further, the amount of the resin 100 penetrated into the fiber bundle 200 may be adjusted. For example, the amount of the resin penetrated by the first roller may be adjusted through the resin knife 50 positioned at the fiber bundle injection part of the first roller, through which the fiber bundle may be partially impregnated.

Further, the fiber bundle 200 may be positioned on the first roller and the second roller, and at this time, when the first roller and the second roller are rotated, the resin 100 supplied into the container 10 may be pulled up to the fiber bundle 200 located on the first roller and the second roller by the first roller and the second roller so that the resin may also be penetrated into the fiber bundle 200.

Hereinafter, the present disclosure will be described in detail through Examples and Experimental Examples.

However, Examples and Experimental Examples below are merely illustrative of the present disclosure, and the content of the present disclosure is not limited by the following Examples.

Tables 1 to 4 below are tables showing process conditions in Examples 1 to 702 below.

TABLE 1

| Examples | Type of resin | $\mu 0$ (Pa.s) | Power-law index | Penetration pressure (atm) | Fiber bundle width (mm) | Results |
|---|---|---|---|---|---|---|
| 1-9 | Polypropylene resin | 273 | 0.3 | 0.5 | 24 | Table 5 |
| 10-18 | Polypropylene resin | 273 | 0.3 | 0.5 | 12 | Table 6 |
| 19-27 | Polypropylene resin | 100 | 0.3 | 0.5 | 24 | Table 7 |
| 28-36 | Polypropylene resin | 100 | 0.3 | 0.5 | 12 | Table 8 |
| 37-45 | Polypropylene resin | 50 | 0.3 | 0.5 | 24 | Table 9 |
| 46-54 | Polypropylene resin | 50 | 0.3 | 0.5 | 12 | Table 10 |
| 55-63 | Polypropylene resin | 50 | 0.3 | 1.0 | 24 | Table 11 |
| 64-72 | Polypropylene resin | 50 | 0.3 | 1.0 | 12 | Table 12 |
| 73-81 | Polypropylene resin | 100 | 0.3 | 1.0 | 24 | Table 13 |
| 82-90 | Polypropylene resin | 100 | 0.3 | 1.0 | 12 | Table 14 |
| 91-99 | Polypropylene resin | 273 | 0.3 | 1.0 | 24 | Table 15 |

TABLE 2

| Examples | Type of resin | $\mu 0$ (Pa.s) | Power-law index | Penetration pressure (atm) | Fiber bundle width (mm) | Results |
|---|---|---|---|---|---|---|
| 100-108 | Polypropylene resin | 273 | 0.3 | 1.0 | 12 | Table 16 |
| 109-117 | Polypropylene resin | 273 | 0.38 | 0.5 | 24 | Table 17 |
| 118-126 | Polypropylene resin | 273 | 0.38 | 0.5 | 12 | Table 18 |
| 127-135 | Polypropylene resin | 100 | 0.38 | 0.5 | 24 | Table 19 |
| 136-144 | Polypropylene resin | 100 | 0.38 | 0.5 | 12 | Table 20 |
| 145-153 | Polypropylene resin | 50 | 0.38 | 0.5 | 24 | Table 21 |
| 154-162 | Polypropylene resin | 50 | 0.38 | 0.5 | 12 | Table 22 |
| 163-171 | Polypropylene resin | 273 | 0.38 | 1.0 | 24 | Table 23 |
| 172-180 | Polypropylene resin | 273 | 0.38 | 1.0 | 12 | Table 24 |
| 181-189 | Polypropylene resin | 100 | 0.38 | 1.0 | 24 | Table 25 |
| 190-198 | Polypropylene resin | 100 | 0.38 | 1.0 | 12 | Table 26 |
| 199-207 | Polypropylene resin | 50 | 0.38 | 1.0 | 24 | Table 27 |
| 208-216 | Polypropylene resin | 50 | 0.38 | 1.0 | 12 | Table 28 |
| 217-225 | Polypropylene resin | 273 | 0.38 | 2.0 | 24 | Table 29 |
| 226-234 | Polypropylene resin | 273 | 0.38 | 2.0 | 12 | Table 30 |
| 235-243 | Polypropylene resin | 150 | 0.38 | 3.0 | 24 | Table 31 |
| 244-252 | Polypropylene resin | 150 | 0.38 | 3.0 | 12 | Table 32 |
| 253-261 | Polypropylene resin | 50 | 0.38 | 2.0 | 24 | Table 33 |
| 262-270 | Polypropylene resin | 50 | 0.38 | 2.0 | 12 | Table 34 |

TABLE 3

| Examples | Type of resin | $\mu 0$ (Pa.s) | Power-law index | Penetration pressure (atm) | Fiber bundle width (mm) | Results |
|---|---|---|---|---|---|---|
| 271-279 | Polypropylene resin | 273 | 0.38 | 3.0 | 24 | Table 35 |
| 280-288 | Polypropylene resin | 273 | 0.38 | 3.0 | 12 | Table 36 |
| 289-297 | Polypropylene resin | 150 | 0.38 | 3.0 | 24 | Table 37 |
| 298-306 | Polypropylene resin | 150 | 0.38 | 3.0 | 12 | Table 38 |
| 307-315 | Polypropylene resin | 100 | 0.38 | 3.0 | 24 | Table 39 |
| 316-324 | Polypropylene resin | 100 | 0.38 | 3.0 | 12 | Table 40 |
| 325-333 | Nylon 6 resin | 50 | 0.6 | 0.5 | 24 | Table 41 |
| 334-342 | Nylon 6 resin | 50 | 0.6 | 0.5 | 12 | Table 42 |

TABLE 3-continued

| Examples | Type of resin | μ0 (Pa·s) | Power-law index | Penetration pressure (atm) | Fiber bundle width (mm) | Results |
|---|---|---|---|---|---|---|
| 343-351 | Nylon 6 resin | 50 | 0.6 | 2.0 | 24 | Table 43 |
| 352-360 | Nylon 6 resin | 50 | 0.6 | 2.0 | 12 | Table 44 |
| 361-369 | Nylon 6 resin | 100 | 0.6 | 0.5 | 24 | Table 45 |
| 370-378 | Nylon 6 resin | 100 | 0.6 | 0.5 | 12 | Table 46 |
| 379-387 | Nylon 6 resin | 100 | 0.6 | 1.0 | 24 | Table 47 |
| 388-396 | Nylon 6 resin | 100 | 0.6 | 1.0 | 12 | Table 48 |
| 397-405 | Nylon 6 resin | 100 | 0.6 | 2.0 | 24 | Table 49 |
| 406-414 | Nylon 6 resin | 100 | 0.6 | 2.0 | 12 | Table 50 |
| 415-423 | Nylon 6 resin | 100 | 0.6 | 3.0 | 24 | Table 51 |
| 424-432 | Nylon 6 resin | 100 | 0.6 | 3.0 | 12 | Table 52 |
| 433-441 | Nylon 12 resin | 10 | 0.66 | 0.5 | 24 | Table 53 |
| 442-450 | Nylon 12 resin | 10 | 0.66 | 0.5 | 12 | Table 54 |
| 451-459 | Nylon 12 resin | 10 | 0.66 | 1.0 | 24 | Table 55 |
| 460-468 | Nylon 12 resin | 10 | 0.66 | 1.0 | 12 | Table 56 |
| 469-477 | Nylon 12 resin | 10 | 0.66 | 2.0 | 24 | Table 57 |
| 478-486 | Nylon 12 resin | 10 | 0.66 | 2.0 | 12 | Table 58 |
| 487-495 | Nylon 12 resin | 50 | 0.66 | 0.5 | 24 | Table 59 |
| 496-504 | Nylon 12 resin | 50 | 0.66 | 0.5 | 12 | Table 60 |

TABLE 4

| Examples | Type of resin | μ0 (Pa·s) | Power-law index | Penetration pressure (atm) | Fiber bundle width (mm) | Results |
|---|---|---|---|---|---|---|
| 505-513 | Nylon 12 resin | 50 | 0.66 | 1.0 | 24 | Table 61 |
| 514-522 | Nylon 12 resin | 50 | 0.66 | 1.0 | 12 | Table 62 |
| 523-531 | Nylon 12 resin | 50 | 0.66 | 2.0 | 24 | Table 63 |
| 532-540 | Nylon 12 resin | 50 | 0.66 | 2.0 | 12 | Table 64 |
| 541-549 | Nylon 12 resin | 50 | 0.66 | 3.0 | 24 | Table 65 |
| 550-558 | Nylon 12 resin | 50 | 0.66 | 3.0 | 12 | Table 66 |
| 559-567 | Nylon 12 resin | 100 | 0.66 | 3.0 | 24 | Table 67 |
| 568-576 | Nylon 12 resin | 100 | 0.66 | 3.0 | 12 | Table 68 |
| 577-585 | Nylon 12 resin | 100 | 0.66 | 5.0 | 24 | Table 69 |
| 586-594 | Nylon 12 resin | 100 | 0.66 | 5.0 | 12 | Table 70 |
| 595-603 | Nylon 66 resin | 200 | 0.66 | 1.0 | 24 | Table 71 |
| 604-612 | Nylon 66 resin | 200 | 0.66 | 1.0 | 12 | Table 72 |
| 613-621 | Nylon 66 resin | 200 | 0.66 | 3.0 | 24 | Table 73 |
| 622-630 | Nylon 66 resin | 200 | 0.66 | 3.0 | 12 | Table 74 |
| 631-639 | Nylon 66 resin | 200 | 0.66 | 5.0 | 24 | Table 75 |
| 640-648 | Nylon 66 resin | 200 | 0.66 | 5.0 | 12 | Table 76 |
| 649-657 | Polycarbonate resin | 100 | 0.9 | 1.0 | 24 | Table 77 |
| 658-666 | Polycarbonate resin | 100 | 0.9 | 1.0 | 12 | Table 78 |
| 667-675 | Polycarbonate resin | 100 | 0.9 | 3.0 | 24 | Table 79 |
| 676-684 | Polycarbonate resin | 100 | 0.9 | 3.0 | 12 | Table 80 |
| 685-693 | Polycarbonate resin | 100 | 0.9 | 5.0 | 24 | Table 81 |
| 694-702 | Polycarbonate resin | 100 | 0.9 | 5.0 | 12 | Table 82 |

Example 1

In order to confirm the penetration time of the resin in the method for manufacturing the long fiber composite according to the embodiment of the present disclosure, the simulation as described below was performed.

Step 1: The penetration pressure (ΔP) of the resin was set to 0.5 atm.

At this time, a polypropylene resin that was a power-law non-Newtonian resin having a zero-shear rate viscosity ($\mu_0$) of 273 Pa·s and a Power-law index (n) of 0.3 was set to be used as the resin.

Step 2: After unfolding a glass fiber bundle 200 in which several thousands of fiber units having a diameter ($D_f$) of 20 μm were bundled to 2,400 tex to have a width of 24 mm, the unfolded glass fiber bundle 200 was set to move in a direction of the draw-out part 30.

Step 3: The distance between the fiber units was set to be adjusted so that the porosity (1-φ) of the glass fiber bundle became 0.15, and the penetration pressure was set so that the polypropylene resin was penetrated into the glass fiber bundle by applying a penetration pressure of 0.5 atm to the polypropylene resin.

Examples 2-9

Simulations were performed in the same manner as in Example 1 above except that the porosity was changed to 0.2, 0.3, 0.4, 0.5, 0.6, 0.7, 0.8, and 0.9 respectively in Example 1 above.

Examples 10-18

Simulations were performed in the same manner as in Example 1 above except that the width of the glass fiber bundle 200 was changed to 12 mm and the porosity was changed to 0.15, 0.2, 0.3, 0.4, 0.5, 0.6, 0.7, 0.8, and 0.9 respectively in Example 1 above.

Examples 19-27

Simulations were performed in the same manner as in Example 1 above except that the zero-shear rate viscosity ($\mu_o$) was changed to 100 and the porosity was changed to 0.15, 0.2, 0.3, 0.4, 0.5, 0.6, 0.7, 0.8, and 0.9 respectively in Example 1 above.

Examples 28-36

Simulations were performed in the same manner as in Example 1 above except that the zero-shear rate viscosity ($\mu_o$) was changed to 100, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 37-45

Simulations were performed in the same manner as in Example 1 above except that the zero-shear rate viscosity ($\mu_o$) was changed to 50 and the porosity was changed to 0.15, 0.2, 0.3, 0.4, 0.5, 0.6, 0.7, 0.8, and 0.9 respectively in Example 1 above.

Examples 46-54

Simulations were performed in the same manner as in Example 1 above except that the zero-shear rate viscosity ($\mu_o$) was changed to 50, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 55-63

Simulations were performed in the same manner as in Example 1 above except that the zero-shear rate viscosity ($\mu_o$) was changed to 50, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Examples 64-72

Simulations were performed in the same manner as in Example 1 above except that the zero-shear rate viscosity ($\mu_o$) was changed to 50, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 73-81

Simulations were performed in the same manner as in Example 1 above except that the zero-shear rate viscosity ($\mu_o$) was changed to 100, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Examples 82-90

Simulation were performed in the same manner as in Example 1 above except that the zero-shear rate viscosity ($\mu_o$) was changed to 100, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 91-99

Simulations were performed in the same manner as in Example 1 above except that the penetration pressure ($\Delta P$) was changed to 1.0 and the porosity was changed to 0.15, 0.2, 0.3, 0.4, 0.5, 0.6, 0.7, 0.8, and 0.9 respectively in Example 1 above.

Examples 100-108

Simulations were performed in the same manner as in Example 1 above except that the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 109-117

Simulations were performed in the same manner as in Example 1 above except that the Power-law index (n) was changed to 0.38 and the porosity was changed to 0.15, 0.2, 0.3, 0.4, 0.5, 0.6, 0.7, 0.8, and 0.9 respectively in Example 1 above.

Examples 118-126

Simulations were performed in the same manner as in Example 1 above except that the Power-law index (n) was changed to 0.38, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 127-135

Simulations were performed in the same manner as in Example 1 above except that the zero-shear rate viscosity ($\mu_o$) was changed to 100, the Power-law index (n) was changed to 0.38, and the porosity was changed to 0.15, 0.2, 0.3, 0.4, 0.5, 0.6, 0.7, 0.8, and 0.9 respectively in Example 1 above.

Examples 136-144

Simulations were performed in the same manner as in Example 1 above except that the zero-shear rate viscosity ($\mu_o$) was changed to 100, the Power-law index (n) was changed to 0.38, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 145-153

Simulations were performed in the same manner as in Example 1 above except that the zero-shear rate viscosity ($\mu_o$) was changed to 50, the Power-law index (n) was changed to 0.38, and the porosity was changed to 0.15, 0.2, 0.3, 0.4, 0.5, 0.6, 0.7, 0.8, and 0.9 respectively in Example 1 above.

Examples 154-162

Simulations were performed in the same manner as in Example 1 above except that the zero-shear rate viscosity ($\mu_0$) was changed to 50, the Power-law index (n) was changed to 0.38, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 163-171

Simulations were performed in the same manner as in Example 1 above except that the Power-law index (n) was changed to 0.38, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Examples 172-180

Simulations were performed in the same manner as in Example 1 above except that the Power-law index (n) was changed to 0.38, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 181-189

Simulations were performed in the same manner as in Example 1 above except that the zero-shear rate viscosity ($\mu_0$) was changed to 100, the Power-law index (n) was changed to 0.38, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Examples 190-198

Simulations were performed in the same manner as in Example 1 above except that the zero-shear rate viscosity ($\mu_0$) was changed to 100, the Power-law index (n) was changed to 0.38, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 199-207

Simulations were performed in the same manner as in Example 1 above except that the zero-shear rate viscosity ($\mu_0$) was changed to 50, the Power-law index (n) was changed to 0.38, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Examples 208-216

Simulations were performed in the same manner as in Example 1 above except that the zero-shear rate viscosity ($\mu_0$) was changed to 50, the Power-law index (n) was changed to 0.38, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 217-225

Simulations were performed in the same manner as in Example 1 above except that the Power-law index (n) was changed to 0.38, the penetration pressure ($\Delta P$) was changed to 2.0, and the porosity was changed to 0.15, 0.2, 0.3, 0.4, 0.5, 0.6, 0.7, 0.8, and 0.9 respectively in Example 1 above.

Examples 226-234

Simulations were performed in the same manner as in Example 1 above except that the Power-law index (n) was changed to 0.38, the penetration pressure ($\Delta P$) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 235-243

Simulations were performed in the same manner as in Example 1 above except that the zero-shear rate viscosity ($\mu_0$) was changed to 150, the Power-law index (n) was changed to 0.38, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Examples 244-252

Simulations were performed in the same manner as in Example 1 above except that the zero-shear rate viscosity ($\mu_0$) was changed to 150, the Power-law index (n) was changed to 0.38, the penetration pressure ($\Delta P$) was changed to 3.0, and the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 253-261

Simulations were performed in the same manner as in Example 1 above except that the zero-shear rate viscosity ($\mu_0$) was changed to 50, the Power-law index (n) was changed to 0.38, the penetration pressure ($\Delta P$) was changed to 2.0, and the porosity was changed to 0.15, 0.2, 0.3, 0.4, 0.5, 0.6, 0.7, 0.8, and 0.9 respectively in Example 1 above.

Examples 262-270

Simulations were performed in the same manner as in Example 1 above except that the zero-shear rate viscosity ($\mu_0$) was changed to 50, the Power-law index (n) was changed to 0.38, the penetration pressure ($\Delta P$) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 271-279

Simulations were performed in the same manner as in Example 1 above except that the Power-law index (n) was changed to 0.38, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Examples 280-288

Simulations were performed in the same manner as in Example 1 above except that the Power-law index (n) was changed to 0.38, the penetration pressure (ΔP) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 289-297

Simulations were performed in the same manner as in Example 1 above except that the zero-shear rate viscosity ($\mu_0$) was changed to 150, the Power-law index (n) was changed to 0.38, the penetration pressure (ΔP) was changed to 3.0, and the porosity was changed to 0.15, 0.2, 0.3, 0.4, 0.5, 0.6, 0.7, 0.8, and 0.9 respectively in Example 1 above.

Examples 298-306

Simulations were performed in the same manner as in Example 1 above except that the zero-shear rate viscosity ($\mu_0$) was changed to 150, the Power-law index (n) was changed to 0.38, the penetration pressure (ΔP) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 307-315

Simulations were performed in the same manner as in Example 1 above except that the zero-shear rate viscosity ($\mu_0$) was changed to 100, the Power-law index (n) was changed to 0.38, the penetration pressure (ΔP) was changed to 3.0, and the porosity was changed to 0.15, 0.2, 0.3, 0.4, 0.5, 0.6, 0.7, 0.8, and 0.9 respectively in Example 1 above.

Examples 316-324

Simulations were performed in the same manner as in Example 1 above except that the zero-shear rate viscosity ($\mu_0$) was changed to 100, the Power-law index (n) was changed to 0.38, the penetration pressure (ΔP) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 325-333

Simulations were performed in the same manner as in Example 1 above except that the resin was changed to a nylon 6 resin, which was a power-law non-Newtonian resin having a zero-shear rate viscosity ($\mu_0$) of 50 Pa·s and a Power-law index (n) of 0.6, and the porosity was changed to 0.15, 0.2, 0.3, 0.4, 0.5, 0.6, 0.7, 0.8, and 0.9 respectively in Example 1 above.

Examples 334-342

Simulations were performed in the same manner as in Example 1 above except that the resin was changed to a nylon 6 resin, which was a power-law non-Newtonian resin having a zero-shear rate viscosity ($\mu_0$) of 50 Pa·s and a Power-law index (n) of 0.6, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 343-351

Simulations were performed in the same manner as in Example 1 above except that the resin was changed to a nylon 6 resin, which was a power-law non-Newtonian resin having a zero-shear rate viscosity ($\mu_0$) of 50 Pa·s and a Power-law index (n) of 0.6, the penetration pressure (ΔP) was changed to 2.0, and the porosity was changed to 0.15, 0.2, 0.3, 0.4, 0.5, 0.6, 0.7, 0.8, and 0.9 respectively in Example 1 above.

Examples 352-360

Simulations were performed in the same manner as in Example 1 above except that the resin was changed to a nylon 6 resin, which was a power-law non-Newtonian resin having a zero-shear rate viscosity ($\mu_0$) of 50 Pa·s and a Power-law index (n) of 0.6, the penetration pressure (ΔP) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Examples 361-369

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, and the porosity was changed to 0.15, 0.2, 0.3, 0.4, 0.5, 0.6, 0.7, 0.8, and 0.9 respectively in Example 1 above.

Examples 370-378

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 379-387

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure (ΔP) was changed to 1.0, and the porosity was changed to 0.15, 0.2, 0.3, 0.4, 0.5, 0.6, 0.7, 0.8, and 0.9 respectively in Example 1 above.

Example 388-396

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure (ΔP) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 397-405

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure ($\Delta P$) was changed to 2.0, and the porosity was changed to 0.15, 0.2, 0.3, 0.4, 0.5, 0.6, 0.7, 0.8, and 0.9 respectively in Example 1 above.

Example 406-414

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure ($\Delta P$) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 406-414

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure ($\Delta P$) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 415-423

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Example 424-432

Simulations were performed in the same manner as in Example 1 above except that the resin was changed to a nylon 6 resin, which was a power-law non-Newtonian resin having a zero-shear rate viscosity ($\mu_0$) of 100 Pa·s and a Power-law index (n) of 0.6, the penetration pressure ($\Delta P$) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 433-441

Simulations were performed in the same manner as in Example 1 above except that the resin was changed to a nylon 12 resin, which was a power-law non-Newtonian resin having a zero-shear rate viscosity ($\mu_0$) of 10 Pa·s and a Power-law index (n) of 0.66, and the porosity was changed to 0.15, 0.2, 0.3, 0.4, 0.5, 0.6, 0.7, 0.8, and 0.9 respectively in Example 1 above.

Example 442-450

Simulations were performed in the same manner as in Example 1 above except that the resin was changed to a nylon 12 resin, which was a power-law non-Newtonian resin having a zero-shear rate viscosity ($\mu_0$) of 10 Pa·s and a Power-law index (n) of 0.66, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 451-459

Simulations were performed in the same manner as in Example 1 above except that the resin was changed to a nylon 12 resin, which was a power-law non-Newtonian resin having a zero-shear rate viscosity ($\mu_0$) of 10 Pa·s and a Power-law index (n) of 0.66, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Example 460-468

Simulations were performed in the same manner as in Example 1 above except that the resin was changed to a nylon 12 resin, which was a power-law non-Newtonian resin having a zero-shear rate viscosity ($\mu_0$) of 10 Pa·s and a Power-law index (n) of 0.66, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 469-477

Simulations were performed in the same manner as in Example 1 above except that the resin was changed to a nylon 12 resin, which was a power-law non-Newtonian resin having a zero-shear rate viscosity ($\mu_0$) of 10 Pa·s and a Power-law index (n) of 0.66, the penetration pressure ($\Delta P$) was changed to 2.0, and the porosity was changed to 0.15, 0.2, 0.3, 0.4, 0.5, 0.6, 0.7, 0.8, and 0.9 respectively in Example 1 above.

Example 478-486

Simulations were performed in the same manner as in Example 1 above except that the resin was changed to a nylon 12 resin, which was a power-law non-Newtonian resin having a zero-shear rate viscosity ($\mu_0$) of 10 Pa·s and a Power-law index (n) of 0.66, the penetration pressure ($\Delta P$) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 487-495

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, and the porosity was changed to 0.15, 0.2, 0.3, 0.4, 0.5, 0.6, 0.7, 0.8, and 0.9 respectively in Example 1 above.

Example 496-504

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 505-513

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Example 514-522

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 523-531

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the penetration pressure ($\Delta P$) was changed to 2.0, and the porosity was changed to 0.15, 0.2, 0.3, 0.4, 0.5, 0.6, 0.7, 0.8, and 0.9 respectively in Example 1 above.

Example 532-540

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the penetration pressure ($\Delta P$) was changed to 2.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 541-549

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Example 550-558

Simulations were performed in the same manner as in Example 1 above except that the resin was changed to a nylon 12 resin, which was a power-law non-Newtonian resin having a zero-shear rate viscosity ($\mu_0$) of 50 Pa·s and a Power-law index (n) of 0.66, the penetration pressure ($\Delta P$) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 559-567

Simulations were performed in the same manner as in Example 1 above except that the resin was changed to a nylon 12 resin, which was a power-law non-Newtonian resin having a zero-shear rate viscosity ($\mu_0$) of 100 Pa·s and a Power-law index (n) of 0.66, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Example 568-576

Simulations were performed in the same manner as in Example 1 above except that the resin was changed to a nylon 12 resin, which was a power-law non-Newtonian resin having a zero-shear rate viscosity ($\mu_0$) of 100 Pa·s and a Power-law index (n) of 0.66, the penetration pressure ($\Delta P$) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 577-585

Simulations were performed in the same manner as in Example 1 above except that the resin was changed to a nylon 12 resin, which was a power-law non-Newtonian resin having a zero-shear rate viscosity ($\mu_0$) of 100 Pa·s and a Power-law index (n) of 0.66, the penetration pressure ($\Delta P$) was changed to 5.0, and the porosity was changed to 0.15, 0.2, 0.3, 0.4, 0.5, 0.6, 0.7, 0.8, and 0.9 respectively in Example 1 above.

Example 586-594

Simulations were performed in the same manner as in Example 1 above except that the resin was changed to a nylon 12 resin, which was a power-law non-Newtonian resin having a zero-shear rate viscosity ($\mu_0$) of 100 Pa·s and a Power-law index (n) of 0.66, the penetration pressure ($\Delta P$) was changed to 5.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 595-603

Simulations were performed in the same manner as in Example 1 above except that the resin was changed to a nylon 66 resin, which was a power-law non-Newtonian resin having a zero-shear rate viscosity ($\mu_0$) of 200 Pa·s and a Power-law index (n) of 0.66, the penetration pressure ($\Delta P$)

was changed to 1.0, and the porosity was changed to 0.15, 0.2, 0.3, 0.4, 0.5, 0.6, 0.7, 0.8, and 0.9 respectively in Example 1 above.

Example 604-612

Simulations were performed in the same manner as in Example 1 above except that the resin was changed to a nylon 66 resin, which was a power-law non-Newtonian resin having a zero-shear rate viscosity ($\mu_0$) of 200 Pa·s and a Power-law index (n) of 0.66, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 613-621

Simulations were performed in the same manner as in Example 1 above except that the resin was changed to a nylon 66 resin, which was a power-law non-Newtonian resin having a zero-shear rate viscosity ($\mu_0$) of 200 Pa·s and a Power-law index (n) of 0.66, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Example 622-630

Simulations were performed in the same manner as in Example 1 above except that the resin was changed to a nylon 66 resin, which was a power-law non-Newtonian resin having a zero-shear rate viscosity ($\mu_0$) of 200 Pa·s and a Power-law index (n) of 0.66, the penetration pressure ($\Delta P$) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 631-639

Simulations were performed in the same manner as in Example 1 above except that the resin was changed to a nylon 66 resin, which was a power-law non-Newtonian resin having a zero-shear rate viscosity ($\mu_0$) of 200 Pa·s and a Power-law index (n) of 0.66, the penetration pressure ($\Delta P$) was changed to 5.0, and the porosity was changed to 0.15, 0.2, 0.3, 0.4, 0.5, 0.6, 0.7, 0.8, and 0.9 respectively in Example 1 above.

Example 640-648

Simulations were performed in the same manner as in Example 1 above except that the resin was changed to a nylon 66 resin, which was a power-law non-Newtonian resin having a zero-shear rate viscosity ($\mu_0$) of 200 Pa·s and a Power-law index (n) of 0.66, the penetration pressure ($\Delta P$) was changed to 5.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 649-657

Simulations were performed in the same manner as in Example 1 above except that the resin was changed to a polycarbonate resin, which was a power-law non-Newtonian resin having a zero-shear rate viscosity ($\mu_0$) of 100 Pa·s and a Power-law index (n) of 0.9, the penetration pressure ($\Delta P$) was changed to 1.0, and the porosity was changed to 0.15, 0.2, 0.3, 0.4, 0.5, 0.6, 0.7, 0.8, and 0.9 respectively in Example 1 above.

Example 658-666

Simulations were performed in the same manner as in Example 1 above except that the resin was changed to a polycarbonate resin, which was a power-law non-Newtonian resin having a zero-shear rate viscosity ($\mu_0$) of 100 Pa·s and a Power-law index (n) of 0.9, the penetration pressure ($\Delta P$) was changed to 1.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 667-675

Simulations were performed in the same manner as in Example 1 above except that the resin was changed to a polycarbonate resin, which was a power-law non-Newtonian resin having a zero-shear rate viscosity ($\mu_0$) of 100 Pa·s and a Power-law index (n) of 0.9, the penetration pressure ($\Delta P$) was changed to 3.0, and the porosity was changed to 0.15, 0.2, 0.3, 0.4, 0.5, 0.6, 0.7, 0.8, and 0.9 respectively in Example 1 above.

Example 676-684

Simulations were performed in the same manner as in Example 1 above except that the resin was changed to a polycarbonate resin, which was a power-law non-Newtonian resin having a zero-shear rate viscosity ($\mu_0$) of 100 Pa·s and a Power-law index (n) of 0.9, the penetration pressure ($\Delta P$) was changed to 3.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Example 685-693

Simulations were performed in the same manner as in Example 1 above except that the resin was changed to a polycarbonate resin, which was a power-law non-Newtonian resin having a zero-shear rate viscosity ($\mu_0$) of 100 Pa·s and a Power-law index (n) of 0.9, the penetration pressure ($\Delta P$) was changed to 5.0, and the porosity was changed to 0.15, 0.2, 0.3, 0.4, 0.5, 0.6, 0.7, 0.8, and 0.9 respectively in Example 1 above.

Example 694-702

Simulations were performed in the same manner as in Example 1 above except that the resin was changed to a polycarbonate resin, which was a power-law non-Newtonian resin having a zero-shear rate viscosity ($\mu_0$) of 100 Pa·s and a Power-law index (n) of 0.9, the penetration pressure ($\Delta P$) was changed to 5.0, the width of the glass fiber bundle 200 was changed to 12 mm, and the porosity was changed to 0.15, 0.2, 0.3, 0.4, 0.5, 0.6, 0.7, 0.8, and 0.9 respectively in Example 1 above.

Experimental Example 1

In the method for manufacturing the long fiber composite according to the embodiment of the present disclosure, the experiment as described below was performed in order to confirm the penetration time of the resin in the impregnation step.

In the step 3 of penetrating the resin into the glass fiber bundle in Examples 1 to 702, a time in which the resin filled 100% the voids of the glass fiber bundle so that the porosity of the glass fiber became 0%, that is, a complete penetration time was measured using Equation 1 below, and the results are shown in Tables 5 to 82 below.

The complete penetration time of within 8 seconds, more preferably within 7 seconds, and even more preferably within 6 seconds may be viewed as a reference time for enabling the impregnation die to be designed.

$$V_0^n = \frac{K_y}{\mu_{eff}} \frac{\Delta P}{L} \quad \text{[Equation 1]}$$

($V_o$: Average velocity of the resin penetrated into the fiber bundle, n: Power-law index of the resin, $K_y$: transverse permeability, $\mu_{eff}$: Effective viscosity, $\Delta P$: Penetration pressure of the resin into the fiber bundle, and L: Thickness of the fiber bundle).

TABLE 5

| | Pi, Φ Vol. Frac. | Porosity (1-Φ) | $V_0$ (Φ) m/sec | Complete penetration time (sec) |
|---|---|---|---|---|
| Example 1 | 0.85 | 0.15 | 1.06E−08 | 3.81E+04 |
| Example 2 | 0.8 | 0.2 | 3.05E−07 | 1.40E+03 |
| Example 3 | 0.7 | 0.3 | 1.37E−05 | 3.62E+01 |
| Example 4 | 0.6 | 0.4 | 1.79E−04 | 3.32E+00 |
| Example 5 | 0.5 | 0.5 | 1.51E−03 | 4.95E−01 |
| Example 6 | 0.4 | 0.6 | 1.10E−03 | 9.16E−02 |
| Example 7 | 0.3 | 0.7 | 8.56E−02 | 1.79E−02 |
| Example 8 | 0.2 | 0.8 | 9.31E−01 | 3.13E−03 |
| Example 9 | 0.1 | 0.9 | 2.80E+01 | 3.49E−04 |

TABLE 6

| | Pi, Φ Vol. Frac. | Porosity (1-Φ) | $V_0$ (Φ) m/sec | Complete penetration time (sec) |
|---|---|---|---|---|
| Example 10 | 0.85 | 0.15 | 1.06E−08 | 7.49E+04 |
| Example 11 | 0.8 | 0.2 | 3.05E−07 | 2.93E+03 |
| Example 12 | 0.7 | 0.3 | 1.37E−05 | 7.55E+01 |
| Example 13 | 0.6 | 0.4 | 1.79E−04 | 6.89E+00 |
| Example 14 | 0.5 | 0.5 | 1.51E−03 | 1.03E+00 |
| Example 15 | 0.4 | 0.6 | 1.10E−02 | 1.89E−01 |
| Example 16 | 0.3 | 0.7 | 8.56E−02 | 3.68E−02 |
| Example 17 | 0.2 | 0.8 | 9.31E−01 | 6.40E−03 |
| Example 18 | 0.1 | 0.9 | 2.80E+01 | 7.06E−04 |

Each of Tables 5 and 6 above shows result data on the complete penetration time when the glass fiber bundle has widths of 24 mm and 12 m under the conditions that the polypropylene resin has a penetration pressure of 0.5 atm, a zero-shear rate viscosity of 273 Pa·s, and a Power-law index of 0.3. It can be seen in the case of the glass fiber bundle having a width of 24 mm that the penetration time of 3.4 seconds or less is taken when the glass fiber bundle has a porosity of 0.4 or more, whereas the penetration time of 36 seconds or more is taken when it has a porosity of 0.3 or less. It can be seen in the case of the glass fiber bundle having a width of 12 mm that the penetration time of 1.03 seconds or less is taken when the glass fiber bundle has a porosity of 30.5 or more, whereas the penetration time of 6.8 seconds or more is taken when it has a porosity of 0.4 or less.

TABLE 7

| | Pi, Φ Vol. Frac. | Porosity (1-Φ) | $V_0$ (Φ) m/sec | Complete penetration time (sec) |
|---|---|---|---|---|
| Example 19 | 0.85 | 0.15 | 3.00E−07 | 1.34E+03 |
| Example 20 | 0.8 | 0.2 | 8.67E−06 | 4.94E+01 |
| Example 21 | 0.7 | 0.3 | 3.89E−04 | 1.27E+00 |
| Example 22 | 0.6 | 0.4 | 5.08E−03 | 1.17E−01 |
| Example 23 | 0.5 | 0.5 | 4.28E−02 | 1.74E−02 |
| Example 24 | 0.4 | 0.6 | 3.13E−01 | 3.22E−03 |
| Example 25 | 0.3 | 0.7 | 2.44E+00 | 6.29E−04 |
| Example 26 | 0.2 | 0.8 | 2.65E−01 | 1.10E−04 |
| Example 27 | 0.1 | 0.9 | 7.95E+02 | 1.23E−05 |

TABLE 8

| | Pi, Φ Vol. Frac. | Porosity (1-Φ) | $V_0$ (Φ) m/sec | Complete penetration time (sec) |
|---|---|---|---|---|
| Example 28 | 0.85 | 0.15 | 3.00E−07 | 2.79E+03 |
| Example 29 | 0.8 | 0.2 | 8.67E−06 | 1.03E+02 |
| Example 30 | 0.7 | 0.3 | 3.89E−04 | 2.65E+00 |
| Example 31 | 0.6 | 0.4 | 5.08E−03 | 2.42E−01 |
| Example 32 | 0.5 | 0.5 | 4.28E−02 | 3.61E−02 |
| Example 33 | 0.4 | 0.6 | 3.13E−01 | 6.65E−03 |
| Example 34 | 0.3 | 0.7 | 2.44E+00 | 1.29E−03 |
| Example 35 | 0.2 | 0.8 | 2.65E+01 | 2.25E−04 |
| Example 36 | 0.1 | 0.9 | 7.95E+02 | 2.48E−05 |

Each of Tables 7 and 8 above shows result data on the complete penetration time when the glass fiber bundle has widths of 24 mm and 12 m under the conditions that the resin has a penetration pressure of 0.5 atm, a zero-shear rate viscosity of 100 Pa·s, and a Power-law index of 0.3.

As shown in Tables 7 and 8 above, it can be seen in both cases of the glass fiber bundle having widths of 24 mm and 12 mm that the complete penetration time exceeds 6 seconds when the porosity is 0.2 or less, whereas the complete penetration time is within 1.27 and 2.65 seconds respectively when the porosity is 0.3 or more.

TABLE 9

| | Pi, Φ Vol. Frac. | Porosity (1-Φ) | $V_0$ (Φ) m/sec | Complete penetration time (sec) |
|---|---|---|---|---|
| Example 37 | 0.85 | 0.15 | 3.02E−06 | 1.33E+02 |
| Example 38 | 0.8 | 0.2 | 8.73E−05 | 4.90E+00 |
| Example 39 | 0.7 | 0.3 | 3.92E−03 | 1.26E−01 |
| Example 40 | 0.6 | 0.4 | 5.12E−02 | 1.16E−02 |
| Example 41 | 0.5 | 0.5 | 4.32E−01 | 1.73E−03 |
| Example 42 | 0.4 | 0.6 | 3.15E+00 | 3.20E−04 |
| Example 43 | 0.3 | 0.7 | 2.45E+01 | 6.24E−05 |
| Example 44 | 0.2 | 0.8 | 2.67E+02 | 1.09E−05 |
| Example 45 | 0.1 | 0.9 | 8.02E+03 | 1.22E−06 |

TABLE 10

| | Pi, Φ Vol. Frac. | Porosity (1-Φ) | $V_0$ (Φ) m/sec | Complete penetration time (sec) |
|---|---|---|---|---|
| Example 46 | 0.85 | 0.15 | 3.02E−06 | 2.77E+02 |
| Example 47 | 0.8 | 0.2 | 8.73E−05 | 1.02E+01 |
| Example 48 | 0.7 | 0.3 | 3.92E−03 | 2.63E−01 |
| Example 49 | 0.6 | 0.4 | 5.12E−02 | 2.41E−02 |

TABLE 10-continued

| | Pi, Φ Vol. Frac. | Porosity (1-Φ) | $V_0$ (Φ) m/sec | Complete penetration time (sec) |
|---|---|---|---|---|
| Example 50 | 0.5 | 0.5 | 4.32E−01 | 3.58E−03 |
| Example 51 | 0.4 | 0.6 | 3.15E+00 | 6.60E−04 |
| Example 52 | 0.3 | 0.7 | 2.45E+01 | 1.28E−04 |
| Example 53 | 0.2 | 0.8 | 2.67E+02 | 2.23E−05 |
| Example 54 | 0.1 | 0.9 | 8.02E+03 | 2.46E−06 |

Each of Tables 9 and 10 above shows result data when the glass fiber bundle has widths of 24 mm and 12 m under the conditions that the polypropylene resin has a penetration pressure of 0.5 atm P a zero-shear rate viscosity of 50 Pa·s, and a Power-law index of 0.3.

As shown in Tables 9 and 10 above, it can be seen in the case of the glass fiber bundle having a width of 24 mm that the complete penetration time exceeds 6 seconds when the porosity is 0.15 or less, whereas the complete penetration time of 4.9 seconds, which is less than 6 seconds, is taken when the porosity is 0.2 or more. It can be seen in the case of the glass fiber bundle having a width of 12 mm that the complete penetration rate exceeds 6 seconds when the porosity is 02 or less, whereas the complete penetration time is within 0.27 seconds when the porosity is 0.3 or more.

TABLE 11

| | Pi, Φ Vol. Frac. | Porosity (1-Φ) | $V_0$ (Φ) m/sec | Complete penetration time (sec) |
|---|---|---|---|---|
| Example 55 | 0.85 | 0.15 | 3.05E−05 | 1.32E+01 |
| Example 56 | 0.8 | 0.2 | 8.80E−04 | 4.86E−01 |
| Example 57 | 0.7 | 0.3 | 3.95E−02 | 1.25E−02 |
| Example 58 | 0.6 | 0.4 | 5.17E−01 | 1.15E−03 |
| Example 59 | 0.5 | 0.5 | 4.35E+00 | 1.71E−04 |
| Example 60 | 0.4 | 0.6 | 3.18E+01 | 3.17E−05 |
| Example 61 | 0.3 | 0.7 | 2.47E+02 | 6.19E−06 |
| Example 62 | 0.2 | 0.8 | 2.69E+03 | 1.09E−06 |
| Example 63 | 0.1 | 0.9 | 8.08E+04 | 1.21E−07 |

TABLE 12

| | Pi, Φ Vol. Frac. | Porosity (1-Φ) | $V_0$ (Φ) m/sec | Complete penetration time (sec) |
|---|---|---|---|---|
| Example 64 | 0.85 | 0.15 | 3.05E−05 | 2.75E+01 |
| Example 65 | 0.8 | 0.2 | 8.80E−04 | 1.01E+00 |
| Example 66 | 0.7 | 0.3 | 3.95E−02 | 2.61E−02 |
| Example 67 | 0.6 | 0.4 | 5.17E−01 | 2.39E−03 |
| Example 68 | 0.5 | 0.5 | 4.35E+00 | 3.55E−04 |
| Example 69 | 0.4 | 0.6 | 3.18E+01 | 6.55E−05 |
| Example 70 | 0.3 | 0.7 | 2.47E+02 | 1.27E−05 |
| Example 71 | 0.2 | 0.8 | 2.69E+03 | 2.22E−06 |
| Example 72 | 0.1 | 0.9 | 8.08E+04 | 2.45E−07 |

Each of Tables 11 and 12 above shows result data when the glass fiber bundle has widths of 24 mm and 12 mm under the conditions that the polypropylene resin has a penetration pressure of 0.5 atm, a zero-shear rate viscosity of 50 Pa·s, and a Power-law index of 0.3. It can be seen in both cases of the glass fiber bundle having the widths of 24 mm and 12 mm that the complete penetration time exceeds 6 seconds when the porosity is 0.15 or less, whereas the complete penetration time is within 0.49 and 1 seconds respectively when the porosity is 0.2 or more.

TABLE 13

| | Pi, Φ Vol. Frac. | Porosity (1-Φ) | $V_0$ (Φ) m/sec | Complete penetration time (sec) |
|---|---|---|---|---|
| Example 73 | 0.85 | 0.15 | 3.02E−06 | 1.33E+02 |
| Example 74 | 0.8 | 0.2 | 8.73E−05 | 4.90E+00 |
| Example 75 | 0.7 | 0.3 | 3.92E−03 | 1.26E−01 |
| Example 76 | 0.6 | 0.4 | 5.12E−02 | 1.16E−02 |
| Example 77 | 0.5 | 0.5 | 4.32E−01 | 1.73E−03 |
| Example 78 | 0.4 | 0.6 | 3.15E+00 | 3.20E−04 |
| Example 79 | 0.3 | 0.7 | 2.45E+01 | 6.24E−05 |
| Example 80 | 0.2 | 0.8 | 2.67E+02 | 1.09E−05 |
| Example 81 | 0.1 | 0.9 | 8.02E+03 | 1.22E−06 |

TABLE 14

| | Pi, Φ Vol. Frac. | Porosity (1-Φ) | $V_0$ (Φ) m/sec | Complete penetration time (sec) |
|---|---|---|---|---|
| Example 82 | 0.85 | 0.15 | 3.02E−06 | 2.77E+02 |
| Example 83 | 0.8 | 0.2 | 8.73E−05 | 1.02E+01 |
| Example 84 | 0.7 | 0.3 | 3.92E−03 | 2.63E−01 |
| Example 85 | 0.6 | 0.4 | 5.12E−02 | 2.41E−02 |
| Example 86 | 0.5 | 0.5 | 4.32E−01 | 3.58E−03 |
| Example 87 | 0.4 | 0.6 | 3.15E+00 | 6.60E−04 |
| Example 88 | 0.3 | 0.7 | 2.45E+01 | 1.28E−04 |
| Example 89 | 0.7 | 0.8 | 2.67E+02 | 2.23E−05 |
| Example 90 | 0.1 | 0.9 | 8.02E+03 | 2.46E−06 |

Each of Tables 13 and 14 above shows result data when the glass fiber bundle has widths of 24 mm and 12 mm under the conditions that the polypropylene resin has a penetration pressure of 1.0 atm. a zero-shear rate viscosity of 100 Pa·s, and a Power-law index of 0.3. It can be seen in the case of the glass fiber bundle having a width of 24 mm that the complete penetration time exceeds 6 seconds when the porosity is 0.15 or less, whereas the complete penetration time is within 4.9 seconds when the porosity is 0.2 or more. It can be seen in the case of the glass fiber bundle having a width of 12 mm that the complete penetration time exceeds 6 seconds when the porosity is 0.2 or less, whereas the complete penetration time is within 0.27 seconds when the porosity is 0.3 or more.

TABLE 15

| | Pi, Φ Vol. Frac. | Porosity (1-Φ) | $V_0$ (Φ) m/sec | Complete penetration time (sec) |
|---|---|---|---|---|
| Example 91 | 0.85 | 0.15 | 1.06E−07 | 3.78E+03 |
| Example 92 | 0.8 | 0.2 | 3.07E−6 | 1.39E+02 |
| Example 93 | 0.7 | 0.3 | 1.38E−04 | 3.60E+00 |
| Example 94 | 0.6 | 0.4 | 1.80E−03 | 3.29E−01 |
| Example 95 | 0.5 | 0.5 | 1.52E−02 | 4.91E−02 |
| Example 96 | 0.4 | 0.6 | 1.11E−01 | 9.09E−03 |
| Example 97 | 0.3 | 0.7 | 8.63E−01 | 1.78E−03 |
| Example 98 | 0.2 | 0.8 | 9.38E+00 | 3.11E−04 |
| Example 99 | 0.1 | 0.9 | 2.82E+02 | 3.46E−05 |

TABLE 16

| | Pi, Φ Vol. Frac. | Porosity (1-Φ) | $V_0$ (Φ) m/sec | Complete penetration time (sec) |
|---|---|---|---|---|
| Example 100 | 0.85 | 0.15 | 1.06E−07 | 7.88E+03 |
| Example 101 | 0.8 | 0.2 | 3.07E−06 | 2.91E+02 |
| Example 102 | 0.7 | 0.3 | 1.38E−04 | 7.49E+00 |

TABLE 16-continued

|  | Pi, Φ Vol. Frac. | Porosity (1-Φ) | $V_0$ (Φ) m/sec | Complete penetration time (sec) |
|---|---|---|---|---|
| Example 103 | 0.6 | 0.4 | 1.80E−03 | 6.84E−01 |
| Example 104 | 0.5 | 0.5 | 1.52E−02 | 1.02E−01 |
| Example 105 | 0.4 | 0.6 | 1.11E−01 | 1.88E−02 |
| Example 106 | 0.3 | 0.7 | 8.63E−01 | 3.65E−03 |
| Example 107 | 0.2 | 0.8 | 9.38E+00 | 6.35E−04 |
| Example 108 | 0.1 | 0.9 | 2.82E+02 | 7.01E−05 |

Tables 15 and 16 above show result data when the glass fiber bundle has widths of 24 mm and 12 mm under the conditions that the polypropylene resin has a penetration pressure of 1.0 atm. a zero-shear rate viscosity of 273 Pa·s, and a Power-law index of 0.3. It can be seen in the case of the glass fiber bundle having a width of 24 mm that the complete penetration time exceeds 6 seconds when the porosity is 0.2 or less, whereas the complete penetration time is within 3.6 seconds when the porosity is 0.3 or more. It can be seen in the case of the glass fiber bundle having a width of 12 mm that the complete penetration time exceeds 6 seconds when the porosity is 0.3 or less, whereas the complete penetration time is within 0.69 seconds when the porosity is 0.4 or more.

TABLE 17

|  | Pi, Φ Vol. Frac. | Porosity (1-Φ) | $V_0$ (Φ) m/sec | Complete penetration time (sec) |
|---|---|---|---|---|
| Example 109 | 0.85 | 0.15 | 9.86E−09 | 4.07E+04 |
| Example 110 | 0.8 | 0.2 | 1.72E−07 | 2.48E+03 |
| Example 111 | 0.7 | 0.3 | 4.35E−06 | 1.14E+02 |
| Example 112 | 0.6 | 0.4 | 3.85E−05 | 1.54E+01 |
| Example 113 | 0.5 | 0.5 | 2.33E−04 | 3.20E+00 |
| Example 114 | 0.4 | 0.6 | 1.24E−03 | 8.11E−01 |
| Example 115 | 0.3 | 0.7 | 6.94E−03 | 2.21E−01 |
| Example 116 | 0.2 | 0.8 | 5.06E−02 | 5.76E−02 |
| Example 117 | 0.1 | 0.9 | 8.44E−01 | 1.16E−02 |

TABLE 18

|  | Pi, Φ Vol. Frac. | Porosity (1-Φ) | $V_0$ (Φ) m/sec | Complete penetration time (sec) |
|---|---|---|---|---|
| Example 118 | 0.85 | 0.15 | 9.86E−09 | 8.50E+04 |
| Example 119 | 0.8 | 0.2 | 1.72E−07 | 5.18E+03 |
| Example 120 | 0.7 | 0.3 | 4.35E−06 | 2.37E+02 |
| Example 121 | 0.6 | 0.4 | 3.85E−05 | 3.20E+01 |
| Example 122 | 0.5 | 0.5 | 2.33E−04 | 6.64E+00 |
| Example 123 | 0.4 | 0.6 | 1.24E−03 | 1.68E+00 |
| Example 124 | 0.3 | 0.7 | 6.94E−03 | 4.54E−01 |
| Example 125 | 0.2 | 0.8 | 5.06E−02 | 1.18E−01 |
| Example 126 | 0.1 | 0.9 | 8.44E−01 | 2.34E−02 |

Tables 17 and 18 above show result data when the glass fiber bundle has widths of 24 mm and 12 mm under the conditions that the polypropylene resin has a penetration pressure of 0.5 atm, a zero-shear rate viscosity of 273 Pa·s, and a Power-law index of 0.38. It can be seen in both cases of the glass fiber bundle having widths of 24 mm and 12 mm that the complete penetration time exceeds 6 seconds when the porosity is 0.4 or less, whereas the complete penetration time is within 3.2 and 6.7 seconds respectively when the porosity is 0.5 or more.

TABLE 19

|  | Pi, Φ Vol. Frac. | Porosity (1-Φ) | $V_0$ (Φ) m/sec | Complete penetration time (sec) |
|---|---|---|---|---|
| Example 127 | 0.85 | 0.15 | 1.39E−07 | 2.90E+03 |
| Example 128 | 0.8 | 0.2 | 2.42E−06 | 1.77E+02 |
| Example 129 | 0.7 | 0.3 | 6.12E−05 | 8.09E+00 |
| Example 130 | 0.6 | 0.4 | 5.41E−04 | 1.10E+00 |
| Example 131 | 0.5 | 0.5 | 3.27E−03 | 2.28E−01 |
| Example 132 | 0.4 | 0.6 | 1.75E−02 | 5.77E−02 |
| Example 133 | 0.3 | 0.7 | 9.75E−02 | 1.57E−02 |
| Example 134 | 0.2 | 0.8 | 7.12E−01 | 4.10E−03 |
| Example 135 | 0.1 | 0.9 | 1.19E+01 | 8.23E−04 |

TABLE 20

|  | Pi, Φ Vol. Frac. | Porosity (1-Φ) | $V_0$ (Φ) m/sec | Complete penetration time (sec) |
|---|---|---|---|---|
| Example 136 | 0.85 | 0.15 | 1.39E−07 | 6.05E+03 |
| Example 137 | 0.8 | 0.2 | 2.42E−06 | 3.69E+02 |
| Example 138 | 0.7 | 0.3 | 6.12E−05 | 1.69E+01 |
| Example 139 | 0.6 | 0.4 | 5.41E−04 | 2.28E+00 |
| Example 140 | 0.5 | 0.5 | 3.27E−03 | 4.72E−01 |
| Example 141 | 0.4 | 0.6 | 1.75E−02 | 1.19E−01 |
| Example 142 | 0.3 | 0.7 | 9.75E−02 | 3.23E−02 |
| Example 143 | 0.2 | 0.8 | 7.12E−01 | 8.38E−03 |
| Example 144 | 0.1 | 0.9 | 1.19E+01 | 1.67E−03 |

Each of Tables 19 and 20 above shows result data when the glass fiber bundle has widths of 24 mm and 12 mm under the conditions that the polypropylene resin has a penetration pressure of 0.5 atm. a zero-shear rate viscosity of 100 Pa·s, and a Power-law index of 0.38. It can be seen in both cases of the glass fiber bundle having widths of 24 mm and 12 mm that the complete penetration time exceeds 6 seconds when the porosity is 0.3 or less, whereas the complete penetration time is within 1.1 and 2.3 seconds respectively when the porosity is 0.4 or more.

TABLE 21

|  | Pi, Φ Vol. Frac. | Porosity (1-Φ) | $V_0$ (Φ) m/sec | Complete penetration time (sec) |
|---|---|---|---|---|
| Example 145 | 0.85 | 0.15 | 8.59E−07 | 4.68E+02 |
| Example 146 | 0.8 | 0.2 | 1.50E−05 | 2.85E+01 |
| Example 147 | 0.7 | 0.3 | 3.79E−04 | 1.31E+00 |
| Example 148 | 0.6 | 0.4 | 3.35E−03 | 1.77E−01 |
| Example 149 | 0.5 | 0.5 | 2.03E−02 | 3.68E−02 |
| Example 150 | 0.4 | 0.6 | 1.08E−01 | 9.31E−03 |
| Example 151 | 0.3 | 0.7 | 6.04E−01 | 2.54E−03 |
| Example 152 | 0.2 | 0.8 | 4.41E+00 | 6.62E−04 |
| Example 153 | 0.1 | 0.9 | 7.35E+01 | 1.33E−04 |

TABLE 22

|  | Pi, Φ Vol. Frac. | Porosity (1-Φ) | $V_0$ (Φ) m/sec | Complete penetration time (sec) |
|---|---|---|---|---|
| Example 154 | 0.85 | 0.15 | 8.59E−07 | 9.76E+02 |
| Example 155 | 0.8 | 0.2 | 1.50E−05 | 5.95E+01 |
| Example 156 | 0.7 | 0.3 | 3.79E−04 | 2.72E+00 |
| Example 157 | 0.6 | 0.4 | 3.35E−03 | 3.68E−01 |
| Example 158 | 0.5 | 0.5 | 2.03E−02 | 7.62E−02 |

TABLE 22-continued

| | Pi, Φ Vol. Frac. | Porosity (1-Φ) | $V_0$ (Φ) m/sec | Complete penetration time (sec) |
|---|---|---|---|---|
| Example 159 | 0.4 | 0.6 | 1.08E−01 | 1.92E−02 |
| Example 160 | 0.3 | 0.7 | 6.04E−01 | 5.22E−03 |
| Example 161 | 0.2 | 0.8 | 4.41E+00 | 1.35E−03 |
| Example 162 | 0.1 | 0.9 | 7.35E+01 | 2.69E−04 |

Each of Tables 21 and 22 above shows result data when the glass fiber bundle has widths of 24 mm and 12 mm under the conditions that the polypropylene resin has a penetration pressure of 0.5 atm. a zero-shear rate viscosity of 50 Pa·s, and a Power-law index of 0.38. It can be seen in both cases of the glass fiber bundle having widths of 24 mm and 12 mm that the complete penetration time exceeds 6 seconds when the porosity is 0.2 or less, whereas the complete penetration time is within 1.32 and 2.72 seconds respectively when the porosity is 0.3 or more.

TABLE 23

| | Pi, Φ Vol. Frac. | Porosity (1-Φ) | $V_0$ (Φ) m/sec | Complete penetration time (sec) |
|---|---|---|---|---|
| Example 163 | 0.85 | 0.15 | 6.11E−08 | 6.57E+03 |
| Example 164 | 0.8 | 0.2 | 1.07E−06 | 4.01E+02 |
| Example 165 | 0.7 | 0.3 | 2.70E−05 | 1.84E+01 |
| Example 166 | 0.6 | 0.4 | 2.38E−04 | 2.49E+00 |
| Example 167 | 0.5 | 0.5 | 1.44E−03 | 5.17E−01 |
| Example 168 | 0.4 | 0.6 | 7.70E−03 | 1.31E−01 |
| Example 169 | 0.3 | 0.7 | 4.30E−02 | 3.57E−02 |
| Example 170 | 0.2 | 0.8 | 3.14E−01 | 9.30E−03 |
| Example 171 | 0.1 | 0.9 | 5.23E+00 | 1.87E−03 |

TABLE 24

| | Pi, Φ Vol. Frac. | Porosity (1-Φ) | $V_0$ (Φ) m/sec | Complete penetration time (sec) |
|---|---|---|---|---|
| Example 172 | 0.85 | 0.15 | 6.11E−08 | 1.37E+04 |
| Example 173 | 0.8 | 0.2 | 1.07E−06 | 8.36E+02 |
| Example 174 | 0.7 | 0.3 | 2.70E−05 | 3.82E+01 |
| Example 175 | 0.6 | 0.4 | 2.38E−04 | 5.17E+00 |
| Example 176 | 0.5 | 0.5 | 1.44E−03 | 1.07E+00 |
| Example 177 | 0.4 | 0.6 | 7.70E−03 | 2.70E−01 |
| Example 178 | 0.3 | 0.7 | 4.30E−02 | 7.33E−02 |
| Example 179 | 0.2 | 0.8 | 3.14E−01 | 1.90E−02 |
| Example 180 | 0.1 | 0.9 | 5.23E+00 | 3.78E−03 |

Each of Tables 23 and 24 above shows result data when the glass fiber bundle has widths of 24 mm and 12 mm under the conditions that the polypropylene resin has a penetration pressure of 1.0 atm, a zero-shear rate viscosity of 273 Pa·s, and a Power-law index of 0.38. It can be seen in both cases of the glass fiber bundle having widths of 24 mm and 12 mm that the complete penetration time exceeds 6 seconds when the porosity is 0.3 or less, whereas the complete penetration time is within 2.5 and 5.2 seconds respectively when the porosity is 0.4 or more.

TABLE 25

| | Pi, Φ Vol. Frac. | Porosity (1-Φ) | $V_0$ (Φ) m/sec | Complete penetration time (sec) |
|---|---|---|---|---|
| Example 181 | 0.85 | 0.15 | 8.59E−07 | 4.68E+02 |
| Example 182 | 0.8 | 0.2 | 1.50E−05 | 2.85E+01 |
| Example 183 | 0.7 | 0.3 | 3.79E−04 | 1.31E+00 |
| Example 184 | 0.6 | 0.4 | 3.35E−03 | 1.77E−01 |
| Example 185 | 0.5 | 0.5 | 2.03E−02 | 3.68E−02 |
| Example 186 | 0.4 | 0.6 | 1.08E−01 | 9.31E−03 |
| Example 187 | 0.3 | 0.7 | 6.04E−01 | 2.54E−03 |
| Example 188 | 0.2 | 0.8 | 4.41E+00 | 6.62E−04 |
| Example 189 | 0.1 | 0.9 | 7.35E+01 | 1.33E−04 |

TABLE 26

| | Pi, Φ Vol. Frac. | Porosity (1-Φ) | $V_0$ (Φ) m/sec | Complete penetration time (sec) |
|---|---|---|---|---|
| Example 190 | 0.85 | 0.15 | 8.59E−07 | 9.76E+02 |
| Example 191 | 0.8 | 0.2 | 1.50E−05 | 5.95E+01 |
| Example 192 | 0.7 | 0.3 | 3.79E−04 | 2.72E+00 |
| Example 193 | 0.6 | 0.4 | 3.35E−03 | 3.68E−01 |
| Example 194 | 0.5 | 0.5 | 2.03E−02 | 7.62E−02 |
| Example 195 | 0.4 | 0.6 | 1.08E−01 | 1.92E−02 |
| Example 196 | 0.3 | 0.7 | 6.04E−01 | 5.22E−03 |
| Example 197 | 0.2 | 0.8 | 4.41E+00 | 1.35E−03 |
| Example 198 | 0.1 | 0.9 | 7.35E+01 | 2.69E−04 |

Each of Tables 25 and 26 above shows result data when the glass fiber bundle has widths of 24 mm and 12 mm under the conditions that the polypropylene resin has a penetration pressure of 1.0 atm, a zero-shear rate viscosity of 100 Pa·s, and a Power-law index of 0.38. It can be seen in both cases of the glass fiber bundle having widths of 24 mm and 12 mm that the complete penetration time exceeds 6 seconds when the porosity is 0.2 or less, whereas the complete penetration time is within 1.32 and 2.73 seconds respectively when the porosity is 0.3 or more.

TABLE 27

| | Pi, Φ Vol. Frac. | Porosity (1-Φ) | $V_0$ (Φ) m/sec | Complete penetration time (sec) |
|---|---|---|---|---|
| Example 199 | 0.85 | 0.15 | 5.32E−06 | 7.54E+01 |
| Example 200 | 0.8 | 0.2 | 9.29E−05 | 4.60E+00 |
| Example 201 | 0.7 | 0.3 | 2.35E−03 | 2.11E−01 |
| Example 202 | 0.6 | 0.4 | 2.08E−02 | 2.86E−02 |
| Example 203 | 0.5 | 0.5 | 1.26E−01 | 5.93E−03 |
| Example 204 | 0.4 | 0.6 | 6.70E−01 | 1.50E−03 |
| Example 205 | 0.3 | 0.7 | 3.74E+00 | 4.09E−04 |
| Example 206 | 0.2 | 0.8 | 2.73E+01 | 1.07E−04 |
| Example 207 | 0.1 | 0.9 | 4.55E+02 | 2.14E−05 |

TABLE 28

| | Pi, Φ Vol. Frac. | Porosity (1-Φ) | $V_0$ (Φ) m/sec | Complete penetration time (sec) |
|---|---|---|---|---|
| Example 208 | 0.85 | 0.15 | 5.32E−06 | 1.57E+02 |
| Example 209 | 0.8 | 0.2 | 9.29E−05 | 9.60E+00 |
| Example 210 | 0.7 | 0.3 | 2.35E−03 | 4.39E−01 |
| Example 211 | 0.6 | 0.4 | 2.08E−02 | 5.94E−02 |

TABLE 28-continued

| | Pi, Φ Vol. Frac. | Porosity (1-Φ) | V₀ (Φ) m/sec | Complete penetration time (sec) |
|---|---|---|---|---|
| Example 212 | 0.5 | 0.5 | 1.26E−01 | 1.23E−02 |
| Example 213 | 0.4 | 0.6 | 6.70E−01 | 3.10E−03 |
| Example 214 | 0.3 | 0.7 | 3.74E+00 | 8.42E−04 |
| Example 215 | 0.2 | 0.8 | 2.73E+01 | 2.18E−04 |
| Example 216 | 0.1 | 0.9 | 4.55E+02 | 4.34E−05 |

Each of Tables 27 and 28 above shows result data when the glass fiber bundle has widths of 24 mm and 12 mm under the conditions that the polypropylene resin has a penetration pressure of 1.0 atm, a zero-shear rate viscosity of 50 Pa·s, and a Power-law index of 0.38. It can be seen in the case of the glass fiber bundle having a width of 24 mm that the complete penetration time exceeds 6 seconds when the porosity is 0.15 or less, whereas the complete penetration time is within 4.7 seconds when the porosity is 0.2 or more. It can be seen in the case of the glass fiber bundle having a width of 12 mm that the complete penetration time exceeds 6 seconds when the porosity is 0.2 or less, whereas the complete penetration time is within 0.44 seconds when the porosity is 0.3 or more.

TABLE 29

| | Pi, Φ Vol. Frac. | Porosity (1-Φ) | V₀ (Φ) m/sec | Complete penetration time (sec) |
|---|---|---|---|---|
| Example 217 | 0.85 | 0.15 | 3.79E−07 | 1.06E+03 |
| Example 218 | 0.8 | 0.2 | 6.61E−06 | 6.47E+01 |
| Example 219 | 0.7 | 0.3 | 1.67E−04 | 2.96E+00 |
| Example 220 | 0.6 | 0.4 | 1.48E−03 | 4.01E−01 |
| Example 221 | 0.5 | 0.5 | 8.94E−03 | 8.33E−02 |
| Example 222 | 0.4 | 0.6 | 4.77E−02 | 2.11E−02 |
| Example 223 | 0.3 | 0.7 | 2.66E−01 | 5.75E−03 |
| Example 224 | 0.2 | 0.8 | 1.94E+00 | 1.50E−03 |
| Example 225 | 0.1 | 0.9 | 3.24E+01 | 3.01E−04 |

TABLE 30

| | Pi, Φ Vol. Frac. | Porosity (1-Φ) | V₀ (Φ) m/sec | Complete penetration time (sec) |
|---|---|---|---|---|
| Example 226 | 0.85 | 0.15 | 3.79E−07 | 2.21E+03 |
| Example 227 | 0.8 | 0.2 | 6.61E−06 | 1.35E+02 |
| Example 228 | 0.7 | 0.3 | 1.67E−04 | 6.17E+00 |
| Example 229 | 0.6 | 0.4 | 1.48E−03 | 8.34E−01 |
| Example 230 | 0.5 | 0.5 | 8.94E−03 | 1.73E−01 |
| Example 231 | 0.4 | 0.6 | 4.77E−02 | 4.36E−02 |
| Example 232 | 0.3 | 0.7 | 2.66E−01 | 1.18E−02 |
| Example 233 | 0.2 | 0.8 | 1.94E+00 | 3.07E−03 |
| Example 234 | 0.1 | 0.9 | 3.24E+01 | 6.10E−04 |

Each of Tables 29 and 30 above shows result data when the glass fiber bundle has widths of 24 mm and 12 mm under the conditions that the polypropylene resin has a penetration pressure of 2.0 atm. a zero-shear rate viscosity of 273 Pa·s, and a Power-law index of 0.38. It can be seen in the case of the glass fiber bundle having a width of 24 mm that the complete penetration time exceeds 6 seconds when the porosity is 0.2 or less, whereas the complete penetration time is within 3.0 seconds when the porosity is 0.3 or more. It can be seen in the case of the glass fiber bundle having a width of 12 mm that the complete penetration time exceeds 6 seconds when the porosity is 0.3 or less, whereas the complete penetration time is within 0.84 seconds when the porosity is 0.4 or more.

TABLE 31

| | Pi, Φ Vol. Frac. | Porosity (1-Φ) | V₀ (Φ) m/sec | Complete penetration time (sec) |
|---|---|---|---|---|
| Example 235 | 0.85 | 0.15 | 5.32E−06 | 7.54E+01 |
| Example 236 | 0.8 | 0.2 | 9.29E−05 | 4.60E+00 |
| Example 237 | 0.7 | 0.3 | 2.35E−03 | 2.11E−01 |
| Example 238 | 0.6 | 0.4 | 2.08E−02 | 2.86E−02 |
| Example 239 | 0.5 | 0.5 | 1.26E−01 | 5.93E−03 |
| Example 240 | 0.4 | 0.6 | 6.70E−01 | 150E−03 |
| Example 241 | 0.3 | 0.7 | 3.74E+00 | 4.09E−04 |
| Example 242 | 0.2 | 0.8 | 2.73E+01 | 1.07E−04 |
| Example 243 | 0.1 | 0.9 | 4.55E+02 | 2.14E−05 |

TABLE 32

| | Pi, Φ Vol. Frac. | Porosity (1-Φ) | V₀ (Φ) m/sec | Complete penetration time (sec) |
|---|---|---|---|---|
| Example 244 | 0.85 | 0.15 | 5.32E−06 | 1.57E+02 |
| Example 245 | 0.8 | 0.2 | 9.29E−05 | 9.60E+00 |
| Example 246 | 0.7 | 0.3 | 2.35E−03 | 4.39E−01 |
| Example 247 | 0.6 | 0.4 | 2.08E−02 | 5.94E−02 |
| Example 248 | 0.5 | 0.5 | 1.26E−01 | 1.23E−02 |
| Example 249 | 0.4 | 0.6 | 6.70E−01 | 3.10E−03 |
| Example 250 | 0.3 | 0.7 | 3.74E+00 | 8.42E−04 |
| Example 251 | 0.2 | 0.8 | 2.73E+01 | 2.18E−04 |
| Example 252 | 0.1 | 0.9 | 4.55E+02 | 4.34E−05 |

Each of Tables 31 and 32 above shows result data when the glass fiber bundle has widths of 24 mm and 12 mm under the conditions that the polypropylene resin has a penetration pressure of 3.0 atm, a zero-shear rate viscosity of 150 Pa·s, and a Power-law index of 0.38. It can be seen in the case of the glass fiber bundle having a width of 24 mm that the complete penetration time exceeds 6 seconds when the porosity is 0.15 or less, whereas the complete penetration time is within 4.6 seconds when the porosity is 0.2 or more. It can be seen in the case of the glass fiber bundle having a width of 12 mm that the complete penetration time exceeds 6 seconds when the porosity is 0.2 or less, whereas the complete penetration time is within 0.44 seconds when the porosity is 0.3 or more.

TABLE 33

| | Pi, Φ Vol. Frac. | Porosity (1-Φ) | V₀ (Φ) m/sec | Complete penetration time (sec) |
|---|---|---|---|---|
| Example 253 | 0.85 | 0.15 | 3.30E−05 | 1.22E+01 |
| Example 254 | 0.8 | 0.2 | 5.76E−04 | 7.43E−01 |
| Example 255 | 0.7 | 0.3 | 1.46E−02 | 3.40E−02 |
| Example 256 | 0.6 | 0.4 | 1.29E−01 | 4.61E−03 |
| Example 257 | 0.5 | 0.5 | 7.79E−01 | 9.57E−04 |
| Example 258 | 0.4 | 0.6 | 4.15E+00 | 2.42E−04 |
| Example 259 | 0.3 | 0.7 | 2.32E+01 | 6.61E−05 |
| Example 260 | 0.2 | 0.8 | 1.69E+02 | 1.72E−05 |
| Example 261 | 0.1 | 0.9 | 2.82E+03 | 3.46E−06 |

TABLE 34

| | Pi, Φ Vol. Frac. | Porosity (1-Φ) | V₀ (Φ) m/sec | Complete penetration time (sec) |
|---|---|---|---|---|
| Example 262 | 0.85 | 0.15 | 3.30E−05 | 2.54E+01 |
| Example 263 | 0.8 | 0.2 | 5.76E−04 | 1.55E+00 |
| Example 264 | 0.7 | 0.3 | 1.46E−02 | 7.08E−02 |

TABLE 34-continued

| | Pi, Φ Vol. Frac. | Porosity (1-Φ) | $V_0$ (Φ) m/sec | Complete penetration time (sec) |
|---|---|---|---|---|
| Example 265 | 0.6 | 0.4 | 1.29E−01 | 9.58E−03 |
| Example 266 | 0.5 | 0.5 | 7.79E−01 | 1.98E−03 |
| Example 267 | 0.4 | 0.6 | 4.15E+00 | 5.01E−04 |
| Example 268 | 0.3 | 0.7 | 2.32E+01 | 1.36E−04 |
| Example 269 | 0.2 | 0.8 | 1.69E+02 | 3.52E−05 |
| Example 270 | 0.1 | 0.9 | 2.82E+03 | 7.00E−06 |

Each of Tables 33 and 34 above shows result data when the glass fiber bundle has widths of 24 mm and 12 mm under the conditions that the polypropylene resin has a penetration pressure of 2.0 atm, a zero-shear rate viscosity of 50 Pa·s, and a Power-law index of 0.38. It can be seen in both cases of the glass fiber bundle having widths of 24 mm and 12 mm that the complete penetration time exceeds 6 seconds when the porosity is 0.15 or less, whereas the complete penetration time is within 0.75 and 1.6 seconds respectively when the porosity is 0.2 or more.

TABLE 35

| | Pi, Φ Vol. Frac. | Porosity (1-Φ) | $V_0$ (Φ) m/sec | Complete penetration time sec |
|---|---|---|---|---|
| Example 271 | 0.85 | 0.15 | 1.10E−06 | 3.65E+02 |
| Example 272 | 0.8 | 0.2 | 1.92E−05 | 2.23E+01 |
| Example 273 | 0.7 | 0.3 | 4.86E−04 | 1.02E+00 |
| Example 274 | 0.6 | 0.4 | 4.29E−03 | 1.38E−01 |
| Example 275 | 0.5 | 0.5 | 2.60E−02 | 2.87E−02 |
| Example 276 | 0.4 | 0.6 | 1.39E−01 | 7.26E−03 |
| Example 277 | 0.3 | 0.7 | 7.74E−01 | 1.98E−03 |
| Example 278 | 0.2 | 0.8 | 5.65E+00 | 5.16E−04 |
| Example 279 | 0.1 | 0.9 | 9.42E+01 | 1.04E−04 |

TABLE 36

| | Pi, Φ Vol. Frac. | Porosity (1-Φ) | $V_0$ (Φ) m/sec | Complete penetration time (sec) |
|---|---|---|---|---|
| Example 280 | 0.85 | 0.15 | 1.10E−06 | 7.61E+02 |
| Example 281 | 0.8 | 0.2 | 1.92E−05 | 4.64E+01 |
| Example 282 | 0.7 | 0.3 | 4.86E−04 | 2.12E+00 |
| Example 283 | 0.6 | 0.4 | 4.29E−03 | 2.87E−01 |
| Example 284 | 0.5 | 0.5 | 2.60E−02 | 5.94E−02 |
| Example 285 | 0.4 | 0.6 | 1.39E−01 | 1.50E−02 |
| Example 286 | 0.3 | 0.7 | 7.74E−01 | 4.07E−03 |
| Example 287 | 0.2 | 0.8 | 5.65E+00 | 1.06E−03 |
| Example 288 | 0.1 | 0.9 | 9.42E+01 | 2.10E−04 |

Tables 35 and 36 above show result data when the glass fiber bundle has widths of 24 mm and 12 mm under the conditions that the polypropylene resin has a penetration pressure of 3.0 atm, a zero-shear rate viscosity of 273 Pa·s, and a Power-law index of 0.38. It can be seen in both cases of the glass fiber bundle having widths of 24 mm and 12 mm that the complete penetration time exceeds 6 seconds when the porosity is 0.2 or less, whereas the complete penetration time is within 1.1 and 2.2 seconds respectively when the porosity is 0.3 or more.

TABLE 37

| | Pi, Φ Vol. Frac. | Porosity (1-Φ) | $V_0$ (Φ) m/sec | Complete penetration time (sec) |
|---|---|---|---|---|
| Example 289 | 0.85 | 0.15 | 5.32E−06 | 7.54E+01 |
| Example 290 | 0.8 | 0.2 | 9.29E−05 | 4.60E+00 |
| Example 291 | 0.7 | 0.3 | 2.35E−03 | 2.11E−01 |
| Example 292 | 0.6 | 0.4 | 2.08E−02 | 2.86E−02 |
| Example 293 | 0.5 | 0.5 | 1.26E−01 | 5.93E−03 |
| Example 294 | 0.4 | 0.6 | 6.70E−01 | 1.50E−03 |
| Example 295 | 0.3 | 0.7 | 3.74E+00 | 4.09E−04 |
| Example 296 | 0.2 | 0.8 | 2.73E+01 | 1.07E−04 |
| Example 297 | 0.1 | 0.9 | 4.55E+02 | 2.14E−05 |

TABLE 38

| | Pi, Φ Vol. Frac. | Porosity (1 − Φ) | $V_0$ (Φ) m/sec | Complete penetration time (sec) |
|---|---|---|---|---|
| Example 298 | 0.85 | 0.15 | 5.32E−06 | 1.57E+02 |
| Example 299 | 0.8 | 0.2 | 9.29E−05 | 9.60E+00 |
| Example 300 | 0.7 | 0.3 | 2.35E−03 | 4.39E−01 |
| Example 301 | 0.6 | 0.4 | 2.08E−02 | 5.94E−02 |
| Example 302 | 0.5 | 0.5 | 1.26E−01 | 1.23E−02 |
| Example 303 | 0.4 | 0.6 | 6.70E−01 | 3.10E−03 |
| Example 304 | 0.3 | 0.7 | 3.74E+00 | 8.42E−04 |
| Example 305 | 0.2 | 0.8 | 2.73E+01 | 2.18E−04 |
| Example 306 | 0.1 | 0.9 | 4.55E+02 | 4.34E−05 |

Each of Tables 37 and 38 above shows result data when the glass fiber bundle has widths of 24 mm and 12 mm under the conditions that the polypropylene resin has a penetration pressure of 3.0 atm, a zero-shear rate viscosity of 150 Pa·s, and a Power-law index of 0.38. It can be seen in the case of the glass fiber bundle having a width of 24 mm that the complete penetration time exceeds 6 seconds when the porosity is 0.15 or less, whereas the complete penetration time is 4.6 seconds or less when the porosity is 0.2 or more. It can be seen in the case of the glass fiber bundle having a width of 12 mm that the complete penetration time exceeds 6 seconds when the porosity is 0.2 or less, whereas the complete penetration time is within 0.44 seconds when the porosity is 0.3 or more.

TABLE 39

| | Pi, Φ Vol. Frac. | Porosity (1 − Φ) | $V_0$ (Φ) m/sec | Complete penetration time (sec) |
|---|---|---|---|---|
| Example 307 | 0.85 | 0.15 | 1.55E−05 | 2.60E+01 |
| Example 308 | 0.8 | 0.2 | 2.70E−04 | 1.58E+00 |
| Example 309 | 0.7 | 0.3 | 6.83E−03 | 7.25E−02 |
| Example 310 | 0.6 | 0.4 | 6.04E−02 | 9.83E−03 |
| Example 311 | 0.5 | 0.5 | 3.65E−01 | 2.04E−03 |
| Example 312 | 0.4 | 0.6 | 1.95E+00 | 5.17E−04 |
| Example 313 | 0.3 | 0.7 | 1.09E+01 | 1.41E−04 |
| Example 314 | 0.2 | 0.8 | 7.94E+01 | 3.67E−05 |
| Example 315 | 0.1 | 0.9 | 1.32E+03 | 7.37E−06 |

TABLE 40

| | Pi, Φ Vol. Frac. | Porosity (1 − Φ) | $V_0$ (Φ) m/sec | Complete penetration time (sec) |
|---|---|---|---|---|
| Example 316 | 0.85 | 0.15 | 1.55E−05 | 5.42E+01 |
| Example 317 | 0.8 | 0.2 | 2.70E−04 | 3.30E+00 |
| Example 318 | 0.7 | 0.3 | 6.83E−03 | 1.51E−01 |

TABLE 40-continued

| | Pi, Φ Vol. Frac. | Porosity (1 − Φ) | $V_0$ (Φ) m/sec | Complete penetration time (sec) |
|---|---|---|---|---|
| Example 319 | 0.6 | 0.4 | 6.04E−02 | 2.04E−02 |
| Example 320 | 0.5 | 0.5 | 3.65E−01 | 4.23E−03 |
| Example 321 | 0.4 | 0.6 | 1.95E+00 | 1.07E−03 |
| Example 322 | 0.3 | 0.7 | 1.09E+01 | 2.90E−04 |
| Example 323 | 0.2 | 0.8 | 7.94E+01 | 7.51E−05 |
| Example 324 | 0.1 | 0.9 | 1.32E+03 | 1.49E−05 |

Tables 39 and 40 above show result data when the glass fiber bundle has widths of 24 mm and 12 mm under the conditions that the polypropylene resin has a penetration pressure of 3.0 atm, a zero-shear rate viscosity of 100 Pa·s, and a Power-law index of 0.38. It can be seen in both cases of the glass fiber bundle having widths of 24 mm and 12 mm that the complete penetration time exceeds 6 seconds when the porosity is 0.15 or less, whereas the complete penetration time is within 1.6 and 3.3 seconds respectively when the porosity is 0.2 or more.

TABLE 41

| | Pi, Φ Vol. Frac. | Porosity (1 − Φ) | $V_0$ (Φ) m/sec | Complete penetration time (sec) |
|---|---|---|---|---|
| Example 325 | 0.85 | 0.15 | 1.57E−07 | 2.64E+03 |
| Example 326 | 0.8 | 0.2 | 1.33E−06 | 3.22E+02 |
| Example 327 | 0.7 | 0.3 | 1.53E−05 | 3.24E+01 |
| Example 328 | 0.6 | 0.4 | 7.88E−05 | 7.53E+00 |
| Example 329 | 0.5 | 0.5 | 3.03E−04 | 2.46E+00 |
| Example 330 | 0.4 | 0.6 | 1.05E−03 | 9.61E−01 |
| Example 331 | 0.3 | 0.7 | 3.71E−03 | 4.13E−01 |
| Example 332 | 0.2 | 0.8 | 1.56E−02 | 1.87E−01 |
| Example 333 | 0.1 | 0.9 | 1.16E−01 | 8.42E−02 |

TABLE 42

| | Pi, Φ Vol. Frac. | Porosity (1 − Φ) | $V_0$ (Φ) m/sec | Complete penetration time (sec) |
|---|---|---|---|---|
| Example 334 | 0.85 | 0.15 | 1.52E−07 | 5.51E+03 |
| Example 335 | 0.8 | 0.2 | 1.33E−06 | 6.71E+02 |
| Example 336 | 0.7 | 0.3 | 1.53E−05 | 6.75E+01 |
| Example 337 | 0.6 | 0.4 | 7.88E−05 | 1.57E+01 |
| Example 338 | 0.5 | 0.5 | 3.03E−04 | 5.10E+00 |
| Example 339 | 0.4 | 0.6 | 1.05E−03 | 1.98E+00 |
| Example 340 | 0.3 | 0.7 | 3.71E−03 | 8.50E−01 |
| Example 341 | 0.2 | 0.8 | 1.56E−02 | 3.81E−01 |
| Example 342 | 0.1 | 0.9 | 1.16E−01 | 1.70E−01 |

Each of Tables 41 and 42 above shows result data when the glass fiber bundle has widths of 24 mm and 12 mm under the conditions that the nylon 6 resin has a penetration pressure of 0.5 atm, a zero-shear rate viscosity of 50 Pa·s, and a Power-law index of 0.6. It can be seen in both cases of the glass fiber bundle having widths of 24 mm and 12 mm that the complete penetration time exceeds 6 seconds when the porosity is 0.4 or less, whereas the complete penetration time is within 2.5 and 5.1 seconds respectively when the porosity is 0.5 or more.

TABLE 43

| | Pi, Φ Vol. Frac. | Porosity (1 − Φ) | $V_0$ (Φ) m/sec | Complete penetration time (sec) |
|---|---|---|---|---|
| Example 343 | 0.85 | 0.15 | 1.53E−06 | 2.62E+02 |
| Example 344 | 0.8 | 0.2 | 1.34E−05 | 3.19E+01 |
| Example 345 | 0.7 | 0.3 | 1.54E−04 | 3.21E+00 |
| Example 346 | 0.6 | 0.4 | 7.94E−04 | 7.47E−01 |
| Example 347 | 0.5 | 0.5 | 3.05E−03 | 2.44E−01 |
| Example 348 | 0.4 | 0.6 | 1.06E−02 | 9.53E−02 |
| Example 349 | 0.3 | 0.7 | 3.74E−02 | 4.10E−02 |
| Example 350 | 0.2 | 0.8 | 1.58E−01 | 1.85E−02 |
| Example 351 | 0.1 | 0.9 | 1.17E+00 | 8.35E−03 |

TABLE 44

| | Pi, Φ Vol. Frac. | Porosity (1 − Φ) | $V_0$ (Φ) m/sec | Complete penetration time (sec) |
|---|---|---|---|---|
| Example 352 | 0.85 | 0.15 | 1.53E−06 | 5.46E+02 |
| Example 353 | 0.8 | 0.2 | 1.34E−05 | 6.66E+01 |
| Example 354 | 0.7 | 0.3 | 1.54E−04 | 6.69E+00 |
| Example 355 | 0.6 | 0.4 | 7.94E−04 | 1.55E+00 |
| Example 356 | 0.5 | 0.5 | 3.05E−03 | 5.06E−01 |
| Example 357 | 0.4 | 0.6 | 1.06E−02 | 1.97E−01 |
| Example 358 | 0.3 | 0.7 | 3.74E−02 | 8.43E−02 |
| Example 359 | 0.2 | 0.8 | 1.58E−01 | 3.78E−02 |
| Example 360 | 0.1 | 0.9 | 1.17E+00 | 1.69E−02 |

Each of Tables 43 and 44 above shows result data when the glass fiber bundle has widths of 24 mm and 12 mm under the conditions that the nylon 6 resin has a penetration pressure of 2.0 atm, a zero-shear rate viscosity of 50 Pa·s, and a Power-law index of 0.6. It can be seen in the case of the glass fiber bundle having a width of 24 mm that the complete penetration time exceeds 6 seconds when the porosity is 0.2 or less, whereas the complete penetration time is within 3.3 seconds when the porosity is 0.3 or more. It can be seen in the case of the glass fiber bundle having a width of 12 mm that the complete penetration time exceeds 6 seconds when the porosity is 0.3 or less, whereas the complete penetration time is within 1.6 seconds when the porosity is 0.4 or more.

TABLE 45

| | Pi, Φ Vol. Frac. | Porosity (1 − Φ) | $V_0$ (Φ) m/sec | Complete penetration time (sec) |
|---|---|---|---|---|
| Example 361 | 0.85 | 0.15 | 4.80E−08 | 8.38E+03 |
| Example 362 | 0.8 | 0.2 | 4.19E−07 | 1.02E+03 |
| Example 363 | 0.7 | 0.3 | 4.82E−06 | 1.03E+02 |
| Example 364 | 0.6 | 0.4 | 2.48E−05 | 2.39E+01 |
| Example 365 | 0.5 | 0.5 | 9.54E−05 | 7.82E+00 |
| Example 366 | 0.4 | 0.6 | 3.30E−04 | 3.05E+00 |
| Example 367 | 0.3 | 0.7 | 1.17E−03 | 1.31E+00 |
| Example 368 | 0.2 | 0.8 | 4.93E−03 | 5.92E−01 |
| Example 369 | 0.1 | 0.9 | 3.65E−02 | 2.67E−01 |

TABLE 46

| | Pi, Φ Vol. Frac. | Porosity (1 − Φ) | $V_0$ (Φ) m/sec | Complete penetration time (sec) |
|---|---|---|---|---|
| Example 370 | 0.85 | 0.15 | 4.80E−08 | 1.75E+04 |
| Example 371 | 0.8 | 0.2 | 4.19E−07 | 2.13E+03 |
| Example 372 | 0.7 | 0.3 | 4.82E−06 | 2.14E+02 |

TABLE 46-continued

|  | Pi, Φ Vol. Frac. | Porosity (1 − Φ) | $V_0$ (Φ) m/sec | Complete penetration time (sec) |
| --- | --- | --- | --- | --- |
| Example 373 | 0.6 | 0.4 | 2.48E−05 | 4.97E+01 |
| Example 374 | 0.5 | 0.5 | 9.54E−05 | 1.62E+01 |
| Example 375 | 0.4 | 0.6 | 3.30E−04 | 6.30E+00 |
| Example 376 | 0.3 | 0.7 | 1.17E−03 | 2.70E+00 |
| Example 377 | 0.2 | 0.8 | 4.93E−03 | 1.21E+00 |
| Example 378 | 0.1 | 0.9 | 3.65E−02 | 5.41E−01 |

Each of Tables 45 and 46 above shows result data when the glass fiber bundle has widths of 24 mm and 12 mm under the conditions that the nylon 6 resin has a penetration pressure of 0.5 atm, a zero-shear rate viscosity of 100 Pa·s, and a Power-law index of 0.6. It can be seen in the case of the glass fiber bundle having a width of 24 mm that the complete penetration time exceeds 6 seconds when the porosity is 0.5 or less, whereas the complete penetration time is within 3.1 seconds when the porosity is 0.6 or more. It can be seen in the case of the glass fiber bundle having a width of 12 mm that the complete penetration time exceeds 6 seconds when the porosity is 0.6 or less, whereas the complete penetration time is within 2.7 seconds when the porosity is 0.7 or more.

TABLE 47

|  | Pi, Φ Vol. Frac. | Porosity (1 − Φ) | $V_0$ (Φ) m/sec | Complete penetration time (sec) |
| --- | --- | --- | --- | --- |
| Example 379 | 0.85 | 0.15 | 1.52E−07 | 2.64E+03 |
| Example 380 | 0.8 | 0.2 | 1.33E−06 | 3.22E+02 |
| Example 381 | 0.7 | 0.3 | 1.53E−05 | 3.24E+01 |
| Example 382 | 0.6 | 0.4 | 7.88E−05 | 7.53E+00 |
| Example 383 | 0.5 | 0.5 | 3.03E−04 | 2.46E+00 |
| Example 384 | 0.4 | 0.6 | 1.05E−03 | 9.61E−01 |
| Example 385 | 0.3 | 0.7 | 3.71E−03 | 4.13E−01 |
| Example 386 | 0.2 | 0.8 | 1.56E−02 | 1.87E−01 |
| Example 387 | 0.1 | 0.9 | 1.16E−01 | 8.42E−02 |

TABLE 48

|  | Pi, Φ Vol. Frac. | Porosity (1 − Φ) | $V_0$ (Φ) m/sec | Complete penetration time (sec) |
| --- | --- | --- | --- | --- |
| Example 388 | 0.85 | 0.15 | 1.57E−07 | 5.51E+03 |
| Example 389 | 0.8 | 0.2 | 1.33E−06 | 6.71E+02 |
| Example 390 | 0.7 | 0.3 | 1.53E−05 | 6.75E+01 |
| Example 391 | 0.6 | 0.4 | 7.88E−05 | 1.57E+01 |
| Example 392 | 0.5 | 0.5 | 3.03E−04 | 5.10E+00 |
| Example 393 | 0.4 | 0.6 | 1.05E−03 | 1.98E+00 |
| Example 394 | 0.3 | 0.7 | 3.71E−03 | 8.50E−01 |
| Example 395 | 0.2 | 0.8 | 1.56E−02 | 3.81E−01 |
| Example 396 | 0.1 | 0.9 | 1.16E−01 | 1.70E−01 |

Each of Tables 47 and 48 above shows result data when the glass fiber bundle has widths of 24 mm and 12 mm under the conditions that the nylon 6 resin has a penetration pressure of 1.0 atm. a zero-shear rate viscosity of 100 Pa·s, and a Power-law index of 0.6. It can be seen in both cases of the glass fiber bundle having widths of 24 mm and 12 mm that the complete penetration time exceeds 6 seconds when the porosity is 0.4 or less, whereas the complete penetration time is within 2.5 and 5.1 seconds respectively when the porosity is 0.5 or more.

TABLE 49

|  | Pi, Φ Vol. Frac. | Porosity (1 − Φ) | $V_0$ (Φ) m/sec | Complete penetration time (sec) |
| --- | --- | --- | --- | --- |
| Example 397 | 0.85 | 0.15 | 4.83E−07 | 8.31E+02 |
| Example 398 | 0.8 | 0.2 | 4.22E−06 | 1.01E+02 |
| Example 399 | 0.7 | 0.3 | 4.85E−05 | 1.02E+01 |
| Example 400 | 0.6 | 0.4 | 2.50E−04 | 2.37E+00 |
| Example 401 | 0.5 | 0.5 | 9.61E−04 | 7.75E−01 |
| Example 402 | 0.4 | 0.6 | 3.33E−03 | 3.03E−01 |
| Example 403 | 0.3 | 0.7 | 1.18E−02 | 1.30E−01 |
| Example 404 | 0.2 | 0.8 | 4.97E−02 | 5.88E−02 |
| Example 405 | 0.1 | 0.9 | 3.68E−01 | 2.65E−02 |

TABLE 50

|  | Pi, Φ Vol. Frac. | Porosity (1 − Φ) | $V_0$ (Φ) m/sec | Complete penetration time (sec) |
| --- | --- | --- | --- | --- |
| Example 406 | 0.85 | 0.15 | 4.83E−07 | 1.73E+03 |
| Example 407 | 0.8 | 0.2 | 4.22E−06 | 2.11E+02 |
| Example 408 | 0.7 | 0.3 | 4.85E−05 | 2.13E+01 |
| Example 409 | 0.6 | 0.4 | 2.50E−04 | 4.93E+00 |
| Example 410 | 0.5 | 0.5 | 9.61E−04 | 1.61E+00 |
| Example 411 | 0.4 | 0.6 | 3.33E−03 | 6.25E−01 |
| Example 412 | 0.3 | 0.7 | 1.18E−02 | 2.68E−01 |
| Example 413 | 0.2 | 0.8 | 4.97E−02 | 1.20E−01 |
| Example 414 | 0.1 | 0.9 | 3.68E−01 | 5.37E−02 |

Each of Tables 49 and 50 above shows result data when the glass fiber bundle has widths of 24 mm and 12 mm under the conditions that the nylon 6 resin has a penetration pressure of 2.0 atm, a zero-shear rate viscosity of 100 Pa·s, and a Power-law index of 0.6. It can be seen in both cases of the glass fiber bundle having widths of 24 mm and 12 mm that the complete penetration time exceeds 6 seconds when the porosity is 0.3 or less, whereas the complete penetration time is within 2.4 and 5.0 seconds respectively when the porosity is 0.4 or more.

TABLE 51

|  | Pi, Φ Vol. Frac. | Porosity (1 − Φ) | $V_0$ (Φ) m/sec | Complete penetration time (sec) |
| --- | --- | --- | --- | --- |
| Example 415 | 0.85 | 0.15 | 9.50E−07 | 4.23E+02 |
| Example 416 | 0.8 | 0.2 | 8.30E−06 | 5.16E+01 |
| Example 417 | 0.7 | 0.1 | 9.54E−05 | 5.19E+00 |
| Example 418 | 0.6 | 0.4 | 4.92E−04 | 1.21E+00 |
| Example 419 | 0.5 | 0.5 | 1.89E−03 | 3.94E−01 |
| Example 420 | 0.4 | 0.6 | 6.54E−03 | 1.54E−01 |
| Example 421 | 0.3 | 0.7 | 2.31E−02 | 6.63E−02 |
| Example 422 | 0.2 | 0.8 | 9.76E−02 | 2.99E−02 |
| Example 423 | 0.1 | 0.9 | 7.23E−01 | 1.35E−02 |

TABLE 52

|  | Pi, Φ Vol. Frac. | Porosity (1 − Φ) | $V_0$ (Φ) m/sec | Complete penetration time (sec.) |
| --- | --- | --- | --- | --- |
| Example 424 | 0.85 | 0.15 | 9.50E−07 | 8.82E+02 |
| Example 425 | 0.8 | 0.2 | 8.30E−06 | 1.08E+02 |
| Example 426 | 0.7 | 0.3 | 9.54E−05 | 1.08E+01 |
| Example 427 | 0.6 | 0.4 | 4.92E−04 | 2.51E+00 |
| Example 428 | 0.5 | 0.5 | 1.89E−03 | 8.18E−01 |

TABLE 52-continued

| | Pi, Φ Vol. Frac. | Porosity (1 − Φ) | $V_0$ (Φ) m/sec | Complete penetration time (sec.) |
|---|---|---|---|---|
| Example 429 | 0.4 | 0.6 | 6.54E−03 | 3.18E−01 |
| Example 430 | 0.3 | 0.7 | 2.31E−02 | 1.36E−01 |
| Example 431 | 0.2 | 0.8 | 9.76E−02 | 6.11E−02 |
| Example 432 | 0.1 | 0.9 | 7.23E−01 | 2.73E−02 |

Each of Tables 51 and 52 above shows result data when the glass fiber bundle has widths of 24 mm and 12 mm under the conditions that the nylon 6 resin has a penetration pressure of 3.0 atm, a zero-shear rate viscosity, of 100 Pa·s, and a Power-law index of 0.6. It can be seen in the case of the glass fiber bundle having a width of 24 mm that the complete penetration time exceeds 6 seconds when the porosity is 0.2 or less, whereas the complete penetration time is 5.2 seconds or less when the porosity is 0.3 or more. It can be seen in the case of the glass fiber bundle having a width of 12 mm that the complete penetration time exceeds 6 seconds when the porosity is 0.3 or less, whereas the complete penetration time is within 2.52 seconds when the porosity is 0.4 or more.

TABLE 53

| | Pi, Φ Vol. Frac. | Porosity (1-Φ) | $V_0$ (Φ) m/sec | Complete penetration time (sec) |
|---|---|---|---|---|
| Example 433 | 0.85 | 0.15 | 1.33E−06 | 3.02E+02 |
| Example 434 | 0.8 | 0.2 | 1.04E−05 | 4.11E+01 |
| Example 435 | 0.7 | 0.3 | 1.06E−04 | 4.68E+00 |
| Example 436 | 0.6 | 0.4 | 5.01E−04 | 1.18E+00 |
| Example 437 | 0.5 | 0.5 | 1.79E−03 | 4.16E−01 |
| Example 438 | 0.4 | 0.6 | 5.80E−03 | 1.74E−01 |
| Example 439 | 0.3 | 0.7 | 1.91E−02 | 8.03E−02 |
| Example 440 | 0.2 | 0.8 | 7.39E−02 | 3.95E−02 |
| Example 441 | 0.1 | 0.9 | 4.82E−01 | 2.02E−02 |

TABLE 54

| | Pi, Φ Vol. Frac. | Porosity (1-Φ) | $V_0$ (Φ) m/sec | Complete penetration time (sec) |
|---|---|---|---|---|
| Example 442 | 0.85 | 0.15 | 1.33E−06 | 6.31E+02 |
| Example 443 | 0.8 | 0.2 | 1.04E−05 | 8.57E+01 |
| Example 444 | 0.7 | 0.3 | 1.06E−04 | 9.75E+00 |
| Example 445 | 0.6 | 0.4 | 5.01E−04 | 2.46E+00 |
| Example 446 | 0.5 | 0.5 | 1.79E−03 | 8.62E−01 |
| Example 447 | 0.4 | 0.6 | 5.80E−03 | 3.59E−01 |
| Example 448 | 0.3 | 0.7 | 1.91E−02 | 1.65E−01 |
| Example 449 | 0.2 | 0.8 | 7.39E−02 | 8.07E−02 |
| Example 450 | 0.1 | 0.9 | 4.82E−01 | 4.10E−02 |

Each of Tables 53 and 54 above shows result data when the glass fiber bundle has widths of 24 mm and 12 mm under the conditions that the nylon 12 resin has a penetration pressure of 0.5 atm, a zero-shear rate viscosity of 10 Pa·s, and a Power-law index of 0.66. It can be seen in the case of the glass fiber bundle having a width of 24 mm that the complete penetration time exceeds 6 seconds when the porosity is 0.2 or less, whereas the complete penetration time is 4.7 seconds or more when the porosity is 0.3 or more. It can be seen in the case of the glass fiber bundle having a width of 12 mm that the complete penetration time exceeds 6 seconds when the porosity is 0.3 or less, whereas the complete penetration time is within 2.5 seconds when the porosity is 0.4 or more.

TABLE 55

| | Pi, Φ Vol. Frac. | Porosity (1-Φ) | $V_0$ (Φ) m/sec | Complete penetration time (sec) |
|---|---|---|---|---|
| Example 451 | 0.85 | 0.15 | 3.80E−06 | 1.06E+02 |
| Example 452 | 0.8 | 0.2 | 2.98E−05 | 1.44E+01 |
| Example 453 | 0.7 | 0.3 | 3.02E−04 | 1.64E+00 |
| Example 454 | 0.6 | 0.4 | 1.43E−03 | 4.14E−01 |
| Example 455 | 0.5 | 0.5 | 5.12E−03 | 1.45E−01 |
| Example 456 | 0.4 | 0.6 | 1.66E−02 | 6.08E−02 |
| Example 457 | 0.3 | 0.7 | 5.45E−02 | 2.81E−02 |
| Example 458 | 0.2 | 0.8 | 2.11E−01 | 1.38E−02 |
| Example 459 | 0.1 | 0.9 | 1.38E+00 | 7.08E−03 |

TABLE 56

| | Pi, Φ Vol. Frac. | Porosity (1-Φ) | $V_0$ (Φ) m/sec | Complete penetration time (sec) |
|---|---|---|---|---|
| Example 460 | 0.85 | 0.15 | 3.80E−06 | 2.21E+02 |
| Example 461 | 0.8 | 0.2 | 2.98E−05 | 3.00E+01 |
| Example 462 | 0.7 | 0.3 | 3.02E−04 | 3.41E+00 |
| Example 463 | 0.6 | 0.4 | 1.43E−03 | 8.61E−01 |
| Example 464 | 0.5 | 0.5 | 5.12E−03 | 3.02E−01 |
| Example 465 | 0.4 | 0.6 | 1.66E−02 | 1.26E−01 |
| Example 466 | 0.3 | 0.7 | 5.45E−02 | 5.78E−02 |
| Example 467 | 0.2 | 0.8 | 2.11E−01 | 2.82E−02 |
| Example 468 | 0.1 | 0.9 | 1.38E+00 | 1.43E−02 |

Tables 55 and 56 above show result data when the glass fiber bundle has widths of 24 mm and 12 mm under the conditions that the nylon 12 resin has a penetration pressure of 1.0 atm, a zero-shear rate viscosity of 10 Pa·s, and a Power-law index of 0.66. It can be seen in both cases of the glass fiber bundle having widths of 24 mm and 12 mm that the complete penetration time exceeds 6 seconds when the porosity is 0.2 or less, whereas the complete penetration time is within 1.7 and 3.41 seconds respectively when the porosity is 0.3 or more.

TABLE 57

| | Pi, (Φ) Vol. Frac. | Porosity (1-Φ) | $V_0$ (Φ) m/sec | Complete penetration time (sec) |
|---|---|---|---|---|
| Example 469 | 0.85 | 0.15 | 1.09E−05 | 3.70E+01 |
| Example 470 | 0.8 | 0.2 | 8.51E−05 | 5.03E+00 |
| Example 471 | 0.7 | 0.3 | 8.64E−04 | 5.73E−01 |
| Example 472 | 0.6 | 0.4 | 4.09E−03 | 1.45E−01 |
| Example 473 | 0.5 | 0.5 | 1.46E−02 | 5.09E−02 |
| Example 474 | 0.4 | 0.6 | 4.74E−02 | 2.13E−02 |
| Example 475 | 0.3 | 0.7 | 1.56E−01 | 9.83E−03 |
| Example 476 | 0.2 | 0.8 | 6.04E−01 | 4.83E−03 |
| Example 477 | 0.1 | 0.9 | 3.94E+00 | 2.48E−03 |

TABLE 58

| | Pi, Φ Vol. Frac. | Porosity (1-Φ) | $V_0$ (Φ) m/sec | Complete penetration time (sec) |
|---|---|---|---|---|
| Example 478 | 0.85 | 0.15 | 1.09E−05 | 7.72E+01 |
| Example 479 | 0.8 | 0.2 | 8.51E−05 | 1.05E+01 |
| Example 480 | 0.7 | 0.3 | 8.64E−04 | 1.19E+00 |
| Example 481 | 0.6 | 0.4 | 4.09E−03 | 3.01E−01 |
| Example 482 | 0.5 | 0.5 | 1.46E−02 | 1.06E−01 |

TABLE 58-continued

| | Pi, Φ Vol. Frac. | Porosity (1-Φ) | $V_0$ (Φ) m/sec | Complete penetration time (sec) |
|---|---|---|---|---|
| Example 483 | 0.4 | 0.6 | 4.74E−02 | 4.39E−02 |
| Example 484 | 0.3 | 0.7 | 1.56E−01 | 2.02E−02 |
| Example 485 | 0.2 | 0.8 | 6.04E−01 | 9.87E−03 |
| Example 486 | 0.1 | 0.9 | 3.94E+00 | 5.01E−03 |

Each of Tables 57 and 58 above shows result data when the glass fiber bundle has widths of 24 mm and 12 mm under the conditions that the nylon 12 resin has a penetration pressure of 2.0 atm. a zero-shear rate viscosity of 10 Pa·s, and a Power-law index of 0.66. It can be seen in the case of the glass fiber bundle having a width of 24 mm that the complete penetration time exceeds 6 seconds when the porosity is 0.15 or less, whereas the complete penetration time is within 5.03 seconds when the porosity is 0.2 or more. It can be seen in the case of the glass fiber bundle having a width of 12 mm that the complete penetration time exceeds 6 seconds when the porosity is 0.2 or less, whereas the complete penetration time is within 1.2 seconds when the porosity is 0.3 or more.

TABLE 59

| | Pi, Φ Vol. Frac. | Porosity (1-Φ) | $V_0$ (Φ) m/sec | Complete penetration time (sec) |
|---|---|---|---|---|
| Example 487 | 0.85 | 0.15 | 1.16E−07 | 3.46E+03 |
| Example 488 | 0.8 | 0.2 | 9.09E−07 | 4.71E+02 |
| Example 489 | 0.7 | 0.3 | 9.23E−06 | 5.36E+01 |
| Example 490 | 0.6 | 0.4 | 4.37E−05 | 1.36E+01 |
| Example 491 | 0.5 | 0.5 | 1.56E−04 | 4.76E+00 |
| Example 492 | 0.4 | 0.6 | 5.06E−04 | 1.99E+00 |
| Example 493 | 0.3 | 0.7 | 1.67E−03 | 9.20E−01 |
| Example 494 | 0.2 | 0.8 | 6.45E−03 | 4.52E−01 |
| Example 495 | 0.1 | 0.9 | 4.21E−02 | 2.32E−01 |

TABLE 60

| | Pi, Φ Vol. Frac. | Porosity (1-Φ) | $V_0$ (Φ) m/sec | Complete penetration time (sec) |
|---|---|---|---|---|
| Example 496 | 0.85 | 0.15 | 1.16E−07 | 7.23E+03 |
| Example 497 | 0.8 | 0.2 | 9.09E−07 | 9.82E+02 |
| Example 498 | 0.7 | 0.3 | 9.23E−06 | 1.12E+02 |
| Example 499 | 0.6 | 0.4 | 4.37E−05 | 2.82E+01 |
| Example 500 | 0.5 | 0.5 | 1.56E−04 | 9.87E+00 |
| Example 501. | 0.4 | 0.6 | 5.06E−04 | 4.11E+00 |
| Example 502 | 0.3 | 0.7 | 1.67E−03 | 1.89E+00 |
| Example 503 | 0.2 | 0.8 | 6.45E−03 | 9.24E−01 |
| Example 504. | 0.1 | 0.9 | 4.21E−02 | 4.69E−01 |

Each of Tables 59 and 60 above shows result data when the glass fiber bundle has widths of 24 mm and 12 mm under the conditions that the nylon 12 resin has a penetration pressure of 0.5 atm, a zero-shear rate viscosity of 50 Pa·s, and a Power-law index of 0.66. It can be seen in the case of the glass fiber bundle having a width of 24 mm that the complete penetration time exceeds 6 seconds when the porosity is 0.4 or less, whereas the complete penetration time is within 4.8 seconds when the porosity is 0.5 or more. It can be seen in the case of the glass fiber bundle having a width of 12 mm that the complete penetration time exceeds 6 seconds when the porosity is 0.5 or less, whereas the complete penetration time is within 4.11 seconds when the porosity is 0.6 or more.

TABLE 61

| | Pi, Φ Vol. Frac. | Porosity (1-Φ) | $V_0$ (Φ) m/sec | Complete penetration time (sec) |
|---|---|---|---|---|
| Example 505 | 0.85 | 0.15 | 3.32E−07 | 1.21E+03 |
| Example 506 | 0.8 | 0.2 | 2.60E−06 | 1.65E+02 |
| Example 507 | 0.7 | 0.3 | 2.64E−05 | 1.88E+01 |
| Example 508 | 0.6 | 0.4 | 1.25E−04 | 4.75E+00 |
| Example 509 | 0.5 | 0.5 | 4.47E−04 | 1.67E+00 |
| Example 510 | 0.4 | 0.6 | 1.45E−03 | 6.96E−01 |
| Example 511 | 0.3 | 0.7 | 4.76E−03 | 3.22E−01 |
| Example 512 | 0.2 | 0.8 | 1.84E−02 | 1.58E−01 |
| Example 513 | 0.1 | 0.9 | 1.20E−01 | 8.11E−02 |

TABLE 62

| | Pi, Φ Vol. Frac. | Porosity (1-Φ) | $V_0$ (Φ) m/sec | Complete penetration time (sec) |
|---|---|---|---|---|
| Example 514 | 0.85 | 0.15 | 3.32E−07 | 2.53E+03 |
| Example 515 | 0.8 | 0.2 | 2.60E−06 | 3.43E+02 |
| Example 516 | 0.7 | 0.3 | 2.64E−05 | 3.91E+01 |
| Example 517 | 0.6 | 0.4 | 1.25E−04 | 9.87E+00 |
| Example 518 | 0.5 | 0.5 | 4.47E−04 | 3.46E+00 |
| Example 519 | 0.4 | 0.6 | 1.45E−03 | 1.44E+00 |
| Example 520 | 0.3 | 0.7 | 4.76E−03 | 6.62E−01 |
| Example 521 | 0.2 | 0.8 | 1.84E−02 | 3.23E−01 |
| Example 522 | 0.1 | 0.9 | 1.20E−01 | 1.64E−01 |

Each of Tables 61 and 62 above shows result data when the glass fiber bundle has widths of 24 mm and 12 mm under the conditions that the nylon 12 resin has a penetration pressure of 1.0 atm, a zero-shear rate viscosity of 50 Pa·s, and a Power-law index of 0.66. It can be seen in the case of the glass fiber bundle having a width of 24 mm that the complete penetration time exceeds 6 seconds when the porosity is 0.3 or less, whereas the complete penetration time is within 4.75 seconds when the porosity is 0.4 or more. It can be seen in the case of the glass fiber bundle having a width of 12 mm that the complete penetration time exceeds 6 seconds when the porosity is 0.4 or less, whereas the complete penetration time is within 3.5 seconds when the porosity is 0.5 or more.

TABLE 63

| | Pi, Φ Vol. Frac. | Porosity (1-Φ) | $V_0$ (Φ) m/sec | Complete penetration time (sec) |
|---|---|---|---|---|
| Example 523 | 0.85 | 0.15 | 9.48E−07 | 4.24E+02 |
| Example 524 | 0.8 | 0.2 | 7.43E−06 | 5.76E+01 |
| Example 525 | 0.7 | 0.3 | 7.54E−05 | 6.56E+00 |
| Example 526 | 0.6 | 0.4 | 3.57E−04 | 1.66E+00 |
| Example 527 | 0.5 | 0.5 | 1.28E−03 | 5.83E−01 |
| Example 528 | 0.4 | 0.6 | 4.14E−03 | 2.44E−01 |
| Example 529 | 0.3 | 0.7 | 1.36E−02 | 1.13E−01 |
| Example 530 | 0.2 | 0.8 | 5.27E−02 | 5.54E−02 |
| Example 531 | 0.1 | 0.9 | 3.44E−01 | 2.84E−02 |

TABLE 64

| | Pi, Φ Vol. Frac. | Porosity (1-Φ) | $V_0$ (Φ) m/sec | Complete penetration time (sec) |
|---|---|---|---|---|
| Example 532 | 0.85 | 0.15 | 9.48E−07 | 8.84E+02 |
| Example 533 | 0.8 | 0.2 | 7.43E−06 | 1.20E+02 |
| Example 534 | 0.7 | 0.3 | 7.54E−05 | 1.37E+01 |

TABLE 64-continued

|  | Pi, Φ Vol. Frac. | Porosity (1-Φ) | $V_0$ (Φ) m/sec | Complete penetration time (sec) |
|---|---|---|---|---|
| Example 535 | 0.6 | 0.4 | 3.57E−04 | 3.45E+00 |
| Example 536 | 0.5 | 0.5 | 1.28E−03 | 1.21E+00 |
| Example 537 | 0.4 | 0.6 | 4.14E−03 | 5.03E−01 |
| Example 538 | 0.3 | 0.7 | 1.36E−02 | 2.32E−01 |
| Example 539 | 0.2 | 0.8 | 5.27E−02 | 1.13E−01 |
| Example 540 | 0.1 | 0.9 | 3.44E−01 | 5.74E−02 |

Each of Tables 63 and 64 above shows result data when the glass fiber bundle has widths of 24 mm and 12 mm under the conditions that the nylon 12 resin has a penetration pressure of 2.0 atm, a zero-shear rate viscosity of 50 Pa·s, and a Power-law index of 0.66. It can be seen in both cases of the glass fiber bundle having widths of 24 mm and 12 mm that the complete penetration time exceeds 6 seconds when the porosity is 0.3 or less, whereas the complete penetration time is within 1.66 and 3.45 seconds respectively when the porosity is 0.4 or more.

TABLE 65

|  | Pi, Φ Vol. Frac. | Porosity (1-Φ) | $V_0$ (Φ) m/sec | Complete penetration time (sec) |
|---|---|---|---|---|
| Example 541 | 0.85 | 0.15 | 1.75E−06 | 2.29E+02 |
| Example 542 | 0.8 | 0.2 | 1.37E−05 | 3.12E+01 |
| Example 543 | 0.7 | 0.3 | 1.39E−04 | 3.55E+00 |
| Example 544 | 0.6 | 0.4 | 6.60E−04 | 8.98E−01 |
| Example 545 | 0.5 | 0.5 | 2.36E−03 | 3.15E−01 |
| Example 546 | 0.4 | 0.6 | 7.64E−03 | 1.32E−01 |
| Example 547 | 0.3 | 0.7 | 2.52E−02 | 6.09E−02 |
| Example 548 | 0.2 | 0.8 | 9.74E−02 | 3.00E−02 |
| Example 549 | 0.1 | 0.9 | 6.36E−01 | 1.53E−02 |

TABLE 66

|  | Pi, Φ Vol. Frac. | Porosity (1-Φ) | $V_0$ (Φ) m/sec | Complete penetration time (sec) |
|---|---|---|---|---|
| Example 550 | 0.85 | 0.15 | 1.75E−06 | 4.78E+02 |
| Example 551 | 0.8 | 0.2 | 1.37E−05 | 6.50E+01 |
| Example 552 | 0.7 | 0.3 | 1.39E−04 | 7.40E+00 |
| Example 553 | 0.6 | 0.4 | 6.60E−04 | 1.87E+00 |
| Example 554 | 0.5 | 0.5 | 2.36E−03 | 6.54E−01 |
| Example 555 | 0.4 | 0.6 | 7.64E−03 | 2.72E−01 |
| Example 556 | 0.3 | 0.7 | 2.52E−0.2 | 125E−01 |
| Example 557 | 0.2 | 0.8 | 9.74E−02 | 6.12E−02 |
| Example 558 | 0.1 | 0.9 | 6.36E−01 | 3.11E−02 |

Each of Tables 65 and 66 above shows result data when the glass fiber bundle has widths of 24 mm and 12 mm under the conditions that the nylon 12 resin has a penetration pressure of 3.0 atm. a zero-shear rate viscosity of 50 Pa·s, and a Power-law index of 0.66. It can be seen in the case of the glass fiber bundle having a width of 24 mm that the complete penetration time exceeds 6 seconds when the porosity is 0.2 or less, whereas the complete penetration time is within 3.55 seconds when the porosity is 0.3 or more. It can be seen in the case of the glass fiber bundle having a width of 12 mm that the complete penetration time exceeds 6 seconds when the porosity is 0.3 or less, whereas the complete penetration time is within 1.87 seconds when the porosity is 0.4 or more.

TABLE 67

|  | Pi, Φ Vol. Frac. | Porosity (1-Φ) | $V_0$ (Φ) m/sec | Complete penetration time (sec) |
|---|---|---|---|---|
| Example 559 | 0.85 | 0.15 | 6.13E−07 | 6.55E+02 |
| Example 560 | 0.8 | 0.2 | 4.80E−06 | 8.91E+01 |
| Example 561 | 0.7 | 0.3 | 4.88E−05 | 1.02E+01 |
| Example 562 | 0.6 | 0.4 | 2.31E−04 | 2.57E+00 |
| Example 563 | 0.5 | 0.5 | 8.27E−04 | 9.02E−01 |
| Example 564 | 0.4 | 0.6 | 2.67E−03 | 3.77E−01 |
| Example 565 | 0.3 | 0.7 | 8.80E−03 | 1.74E−01 |
| Example 566 | 0.2 | 0.8 | 3.41E−02 | 8.56E−02 |
| Example 567 | 0.1 | 0.9 | 2.22E−01 | 4.39E−02 |

TABLE 68

|  | Pi, Φ Vol. Frac. | Porosity (1-Φ) | $V_0$ (Φ) m/sec | Complete penetration time (sec) |
|---|---|---|---|---|
| Example 568 | 0.85 | 0.15 | 6.13E−07 | 1.37E+03 |
| Example 569 | 0.8 | 0.2 | 4.80E−06 | 1.86E+02 |
| Example 570 | 0.7 | 0.3 | 4.88E−05 | 2.11E+01 |
| Example 571 | 0.6 | 0.4 | 2.31E−04 | 5.34E+00 |
| Example 572 | 0.5 | 0.5 | 8.27E−04 | 1.87E+00 |
| Example 573 | 0.4 | 0.6 | 2.67E−03 | 7.78E−01 |
| Example 574 | 0.3 | 0.7 | 8.80E−03 | 3.58E−01 |
| Example 575 | 0.2 | 0.8 | 3.41E−02 | 1.75E−01 |
| Example 576 | 0.1 | 0.9 | 2.22E−01 | 8.88E−02 |

Each of Tables 67 and 68 above shows result data when the glass fiber bundle has widths of 24 mm and 12 mm under the conditions that the nylon 12 resin has a penetration pressure of 3.0 atm, a zero-shear rate viscosity of 100 Pa·s, and a Power-law index of 0.66. It can be seen in both cases of the glass fiber bundle having widths of 24 mm and 12 mm that the complete penetration time exceeds 6 seconds when the porosity is 0.3 or less, whereas the complete penetration time is within 2.57 and 5.34 seconds respectively when the porosity is 0.4 or more.

TABLE 69

|  | Pi, Φ Vol. Frac. | Porosity (1-Φ) | $V_0$ (Φ) m/sec | Complete penetration time (sec) |
|---|---|---|---|---|
| 2 | 0.85 | 0.15 | 9.48E−07 | 4.24E+02 |
| Example 578 | 0.8 | 0.2 | 7.43E−06 | 5.76E+01 |
| Example 579 | 0.7 | 0.3 | 7.54E−05 | 6.56E+00 |
| Example 580 | 0.6 | 0.4 | 3.57E−04 | 1.66E+00 |
| Example 581 | 0.5 | 0.5 | 1.28E−03 | 5.83E−01 |
| Example 582 | 0.4 | 0.6 | 4.14E−03 | 2.44E−01 |
| Example 583 | 0.3 | 0.7 | 1.36E−02 | 1.13E−01 |
| Example 584 | 0.2 | 0.8 | 5.27E−02 | 5.54E−02 |
| Example 585 | 0.1 | 0.9 | 3.44E−01 | 2.84E−02 |

TABLE 70

|  | Pi, Φ Vol. Frac. | Porosity (1-Φ) | $V_0$ (Φ) m/sec | Complete penetration time (sec) |
|---|---|---|---|---|
| Example 586 | 0.85 | 0.15 | 9.48E−07 | 8.84E+02 |
| Example 587 | 0.8 | 0.2 | 7.43E−06 | 1.20E+02 |
| Example 588 | 0.7 | 0.3 | 7.54E−05 | 1.37E+01 |
| Example 589 | 0.6 | 0.4 | 3.57E−04 | 3.45E+00 |
| Example 590 | 0.5 | 0.5 | 1.28E−03 | 1.21E+00 |

TABLE 70-continued

| | Pi, Φ Vol Frac. | Porosity (1-Φ) | $V_0(\Phi)$ m/sec | Complete penetration time (sec) |
|---|---|---|---|---|
| Example 591 | 0.4 | 0.6 | 4.14E−03 | 5.03E−01 |
| Example 592 | 0.3 | 0.7 | 1.36E−02 | 2.32E−01 |
| Example 593 | 0.2 | 0.8 | 5.27E−02 | 1.13E−01 |
| Example 594 | 0.1 | 0.9 | 3.44E−01 | 5.74E−02 |

Each of Tables 69 and 70 above shows result data when the glass fiber bundle has widths of 24 mm and 12 mm under the conditions that the nylon 12 resin has a penetration pressure of 5.0 atm, a zero-shear rate viscosity of 100 Pa·s, and a Power-law index of 0.66. It can be seen in both cases of the glass fiber bundle having widths of 24 mm and 12 mm that the complete penetration time exceeds 6 seconds when the porosity is 0.3 or less, whereas the complete penetration time is within 1.66 and 3.45 seconds respectively when the porosity is 0.4 or more.

TABLE 71

| | Pi, Φ Vol. Frac. | Porosity (1-Φ) | $V_0(\Phi)$ m/sec | Complete penetration time (sec) |
|---|---|---|---|---|
| Example 595 | 0.85 | 0.15 | 4.06E−08 | 9.90E+03 |
| Example 596 | 0.8 | 0.2 | 3.18E−07 | 1.35E+03 |
| Example 597 | 0.7 | 0.3 | 3.23E−06 | 1.53E+02 |
| Example 598 | 0.6 | 0.4 | 1.53E−05 | 3.88E+01 |
| Example 599 | 0.5 | 0.5 | 5.47E−05 | 1.36E+01 |
| Example 600 | 0.4 | 0.6 | 1.77E−04 | 5.69E+00 |
| Example 601 | 0.3 | 0.7 | 5.83E−04 | 2.63E+00 |
| Example 602 | 0.2 | 0.8 | 2.26E−03 | 1.29E+00 |
| Example 603 | 0.1 | 0.9 | 1.47E−02 | 6.62E−01 |

TABLE 72

| | Pi, Φ Vol. Frac. | Porosity (1-Φ) | $V_0(\Phi)$ m/sec | Complete penetration time (sec) |
|---|---|---|---|---|
| Example 604 | 0.85 | 0.15 | 4.06E−08 | 2.07E+04 |
| Example 605 | 0.8 | 0.2 | 3.18E−07 | 2.81E+03 |
| Example 606 | 0.7 | 0.3 | 3.23E−06 | 3.19E+02 |
| Example 607 | 0.6 | 0.4 | 1.53E−05 | 8.06E+01 |
| Example 608 | 0.5 | 0.5 | 5.47E−05 | 2.82E+01 |
| Example 609 | 0.4 | 0.6 | 1.77E−04 | 1.18E+01 |
| Example 610 | 0.3 | 0.7 | 5.83E−04 | 5.41E+00 |
| Example 611 | 0.2 | 0.8 | 2.26E−03 | 2.64E+00 |
| Example 612 | 0.1 | 0.9 | 1.47E−02 | 1.34E+00 |

Each of Tables 71 and 72 above shows result data when the glass fiber bundle has widths of 24 mm and 12 mm under the conditions that the nylon 66, resin has a penetration pressure of 1.0 atm. a zero-shear rate viscosity of 200 Pa·s, and a Power-law index of 0.66. It can be seen in the case of the glass fiber bundle having a width of 24 mm that the complete penetration time exceeds 6 seconds when the porosity is 0.5 or less, whereas the complete penetration time is within 5.69 seconds when the porosity is 0.6 or more. It can be seen in the case of the glass fiber bundle having a width of 12 mm that the complete penetration time exceeds 6 seconds when the porosity is 0.6 or less, whereas the complete penetration time is within 5.42 seconds when the porosity is 0.7 or more.

TABLE 73

| | Pi, Φ Vol. Frac. | Porosity (1-Φ) | $V_0(\Phi)$ m/sec | Complete penetration time (sec) |
|---|---|---|---|---|
| Example 613 | 0.85 | 0.15 | 2.14E−07 | 1.87E+03 |
| Example 614 | 0.8 | 0.2 | 1.68E−06 | 2.55E+02 |
| Example 615 | 0.7 | 0.3 | 1.71E−05 | 2.90E+01 |
| Example 616 | 0.6 | 0.4 | 8.08E−05 | 7.34E+00 |
| Example 617 | 0.5 | 0.5 | 2.89E−04 | 2.58E+00 |
| Example 618 | 0.4 | 0.6 | 9.36E−04 | 1.08E+00 |
| Example 619 | 0.3 | 0.7 | 3.08E−03 | 4.98E−01 |
| Example 620 | 0.2 | 0.8 | 1.19E−02 | 2.45E−01 |
| Example 621 | 0.1 | 0.9 | 7.78E−02 | 1.25E−01 |

TABLE 74

| | Pi, Φ Vol. Frac. | Porosity (1-Φ) | $V_0(\Phi)$ m/sec | Complete penetration time (sec) |
|---|---|---|---|---|
| Example 622 | 0.85 | 0.15 | 2.14E−07 | 3.91E+03 |
| Example 623 | 0.8 | 0.2 | 1.68E−06 | 5.31E+02 |
| Example 624 | 0.7 | 0.3 | 1.71E−05 | 6.04E+01 |
| Example 625 | 0.6 | 0.4 | 8.08E−05 | 1.53E+01 |
| Example 626 | 0.5 | 0.5 | 2.89E−04 | 5.34E+00 |
| Example 627 | 0.4 | 0.6 | 9.36E−04 | 2.22E+00 |
| Example 628 | 0.3 | 0.7 | 3.08E−03 | 1.02E+00 |
| Example 629 | 0.2 | 0.8 | 1.19E−02 | 5.00E−01 |
| Example 630 | 0.1 | 0.9 | 7.78E−02 | 2.54E−01 |

Each of Tables 73 and 74 above shows result data when the glass fiber bundle has widths of 24 mm and 12 mm under the conditions that the nylon 66 resin has a penetration pressure of 3.0 atm, a zero-shear rate viscosity of 200 Pa·s, and a Power-law index of 0.66. It can be seen in both cases of the glass fiber bundle having widths of 24 mm and 12 mm that the complete penetration time exceeds 6 seconds when the porosity is 0.4 or less, whereas the complete penetration time is within 2.58 and 5.34 seconds respectively when the porosity is 0.5 or more.

TABLE 75

| | Pi, Φ Vol. Frac. | Porosity (1-Φ) | $V_0(\Phi)$ m/sec | Complete penetration time (sec) |
|---|---|---|---|---|
| Example 631 | 0.85 | 0.15 | 4.65E−07 | 8.64E+02 |
| Example 632 | 0.8 | 0.2 | 3.64E−06 | 1.17E+02 |
| Example 633 | 0.7 | 0.3 | 3.70E−05 | 1.34E+01 |
| Example 634 | 0.6 | 0.4 | 1.75E−04 | 3.39E+00 |
| Example 635 | 0.5 | 0.5 | 6.27E−04 | 1.19E+00 |
| Example 636 | 0.4 | 0.6 | 2.03E−03 | 4.96E−01 |
| Example 637 | 0.3 | 0.7 | 6.68E−03 | 2.30E−01 |
| Example 638 | 0.2 | 0.8 | 2.59E−02 | 1.13E−01 |
| Example 639 | 0.1 | 0.9 | 1.69E−01 | 5.78E−02 |

TABLE 76

| | Pi, Φ Vol. Frac. | Porosity (1-Φ) | $V_0(\Phi)$ m/sec | Complete penetration time (sec) |
|---|---|---|---|---|
| Example 640 | 0.85 | 0.15 | 4.65E−07 | 1.80E+03 |
| Example 641 | 0.8 | 0.2 | 3.64E−06 | 2.45E+02 |
| Example 642 | 0.7 | 0.3 | 3.70E−05 | 2.79E+01 |
| Example 643 | 0.6 | 0.4 | 1.75E−04 | 7.04E+00 |
| Example 644 | 0.5 | 0.5 | 6.27E−04 | 2.46E+00 |

TABLE 76-continued

|  | Pi, Φ Vol. Frac. | Porosity (1-Φ) | $V_0$ (Φ) m/sec | Complete penetration time (sec) |
|---|---|---|---|---|
| Example 645 | 0.4 | 0.6 | 2.03E−03 | 1.03E+00 |
| Example 646 | 0.3 | 0.7 | 6.68E−03 | 4.72E−01 |
| Example 647 | 0.2 | 0.8 | 2.59E−02 | 2.31E−01 |
| Example 648 | 0.1 | 0.9 | 1.69E−01 | 1.17E−01 |

Each of Tables 75 and 76 above shows result data when the glass fiber bundle has widths of 24 mm and 12 mm under the conditions that the nylon 66 resin has a penetration pressure of 5.0 atm, a zero-shear rate viscosity of 200 Pa·s, and a Power-law index of 0.66. It can be seen in the case of the glass fiber bundle having a width of 24 mm that the complete penetration time exceeds 6 seconds when the porosity is 0.3 or less, whereas the complete penetration time is within 3.39 seconds when the porosity is 0.4 or more. It can be seen in the case of the glass fiber bundle having a width of 12 mm that the complete penetration time exceeds 6 seconds when the porosity is 0.4 or less, whereas the complete penetration time is within 2.46 seconds when the porosity is 0.5 or more.

TABLE 77

|  | Pi, Φ Vol. Frac. | Porosity (1-Φ) | $V_0$ (Φ) m/sec | Complete penetration time (sec) |
|---|---|---|---|---|
| Example 649 | 0.85 | 0.15 | 5.62E−08 | 7.15E+03 |
| Example 650 | 0.8 | 0.2 | 3.30E−07 | 1.30E+03 |
| Example 651 | 0.7 | 0.3 | 2.41E−06 | 2.06E+02 |
| Example 652 | 0.6 | 0.4 | 9.09E−06 | 6.52E+01 |
| Example 653 | 0.5 | 0.5 | 2.69E−05 | 2.77E+01 |
| Example 654 | 0.4 | 0.6 | 7.26E−05 | 1.39E+01 |
| Example 655 | 0.3 | 0.7 | 1.97E−04 | 7.76E+00 |
| Example 656 | 0.2 | 0.8 | 6.08E−04 | 4.80E+00 |
| Example 657 | 0.1 | 0.9 | 2.82E−03 | 3.45E+00 |

TABLE 78

|  | Pi, Φ Vol. Frac. | Porosity (1-Φ) | $V_0$ (Φ) m/sec | Complete penetration time (sec) |
|---|---|---|---|---|
| Example 658 | 0.85 | 0.15 | 5.62E−08 | 1.49E+04 |
| Example 659 | 0.8 | 0.2 | 3.30E−07 | 2.71E+03 |
| Example 660 | 0.7 | 0.3 | 2.41E−06 | 4.29E+02 |
| Example 661 | 0.6 | 0.4 | 9.09E−06 | 1.36E+02 |
| Example 662 | 0.5 | 0.5 | 2.69E−05 | 5.74E+01 |
| Example 663 | 0.4 | 0.6 | 7.26E−05 | 2.86E+01 |
| Example 664 | 0.3 | 0.7 | 1.97E−04 | 1.60E+01 |
| Example 665 | 0.2 | 0.8 | 6.08E−04 | 9.81E+00 |
| Example 666 | 0.1 | 0.9 | 2.82E−03 | 6.99E+00 |

Each of Tables 77 and 78 above shows result data when the glass fiber bundle has widths of 24 mm and 12 mm under the conditions that the polycarbonate resin has a penetration pressure of 1.0 atm, a zero-shear rate viscosity of 100 Pa·s, and a Power-law index of 0.9. It can be seen in the case of the glass fiber bundle having a width of 24 mm that the complete penetration time exceeds 6 seconds when the porosity is 0.7 or less, whereas the complete penetration time is within 4.8 seconds when the porosity is 0.8 or more. It can be seen in the case of the glass fiber bundle having a width of 12 mm that the complete penetration time exceeds 6 seconds even at the porosity of 0.9.

TABLE 79

|  | Pi, Φ Vol. Frac. | Porosity (1-Φ) | $V_0$ (Φ) m/sec | Complete penetration time (sec) |
|---|---|---|---|---|
| Example 667 | 0.85 | 0.15 | 1.91E−07 | 2.11E+03 |
| Example 668 | 0.8 | 0.2 | 1.12E−06 | 3.83E+02 |
| Example 669 | 0.7 | 0.3 | 8.16E−06 | 6.07E+01 |
| Example 670 | 0.6 | 0.4 | 3.08E−05 | 1.92E+01 |
| Example 671 | 0.5 | 0.5 | 9.12E−05 | 8.17E+00 |
| Example 672 | 0.4 | 0.6 | 2.46E−04 | 4.09E+00 |
| Example 673 | 0.3 | 0.7 | 6.69E−04 | 2.29E+00 |
| Example 674 | 0.2 | 0.8 | 2.06E−03 | 1.42E+00 |
| Example 675 | 0.1 | 0.9 | 9.57E−03 | 1.02E+00 |

TABLE 80

|  | Pi, Φ Vol. Frac. | Porosity (1-Φ) | $V_0$ (Φ) m/sec | Complete penetration time (sec) |
|---|---|---|---|---|
| Example 676 | 0.85 | 0.15 | 1.91E−07 | 4.40E+03 |
| Example 677 | 0.8 | 0.2 | 1.12E−06 | 7.99E+02 |
| Example 678 | 0.7 | 0.3 | 8.16E−06 | 1.26E+02 |
| Example 679 | 0.6 | 0.4 | 3.08E−05 | 4.00E+01 |
| Example 680 | 0.5 | 0.5 | 9.12E−05 | 1.69E+01 |
| Example 681 | 0.4 | 0.6 | 2.46E−04 | 8.45E+00 |
| Example 682 | 0.3 | 0.7 | 6.69E−04 | 4.71E+00 |
| Example 683 | 0.2 | 0.8 | 2.06E−03 | 2.89E+00 |
| Example 684 | 0.1 | 0.9 | 9.57E−03 | 2.06E+00 |

Each of Tables 79 and 80 above shows result data when the glass fiber bundle has widths of 24 mm and 12 mm under the conditions that the polycarbonate resin has a penetration pressure of 3.0 atm, a zero-shear rate viscosity of 100 Pa·s, and a Power-law index of 0.9. It can be seen in the case of the glass fiber bundle having a width of 24 mm that the complete penetration time exceeds 6 seconds when the porosity is 0.5 or less, whereas the complete penetration time is within 4.09 seconds when the porosity is 0.6 or more. It can be seen in the case of the glass fiber bundle having a width of 12 mm that the complete penetration time exceeds 6 seconds when the porosity is 0.6 or less, whereas the complete penetration time is within 4.71 seconds when the porosity is 0.7 or more.

TABLE 81

|  | Pi, Φ Vol. Frac. | Porosity (1-Φ) | $V_0$ (Φ) m/sec | Complete penetration time (sec) |
|---|---|---|---|---|
| Example 685 | 0.85 | 0.15 | 3.36E−07 | 1.20E+03 |
| Example 686 | 0.8 | 0.2 | 1.97E−06 | 2.17E+02 |
| Example 687 | 0.7 | 0.3 | 1.44E−05 | 3.44E+01 |
| Example 688 | 0.6 | 0.4 | 5.44E−05 | 1.09E+01 |
| Example 689 | 0.5 | 0.5 | 1.61E−04 | 4.63E+00 |
| Example 690 | 0.4 | 0.6 | 4.34E−04 | 2.32E+00 |
| Example 691 | 0.3 | 0.7 | 1.18E−03 | 1.30E+00 |
| Example 692 | 0.2 | 0.8 | 3.63E−03 | 8.03E−01 |
| Example 693 | 0.1 | 0.9 | 1.69E−02 | 5.78E−01 |

TABLE 82

|  | Pi, Φ Vol. Frac. | Porosity (1-Φ) | $V_0$ (Φ) m/sec | Complete penetration time (sec) |
|---|---|---|---|---|
| Example 694 | 0.85 | 0.15 | 3.36E−07 | 2.49E+03 |
| Example 695 | 0.8 | 0.2 | 1.97E−06 | 4.53E+02 |
| Example 696 | 0.7 | 0.3 | 1.44E−05 | 7.17E+01 |

TABLE 82-continued

|  | Pi, Φ Vol. Frac. | Porosity (1-Φ) | $V_0$ (Φ) m/sec | Complete penetration time (sec) |
|---|---|---|---|---|
| Example 697 | 0.6 | 0.4 | 5.44E−05 | 2.27E+01 |
| Example 698 | 0.5 | 0.5 | 1.61E−04 | 9.60E+00 |
| Example 699 | 0.4 | 0.6 | 4.34E−04 | 4.79E+00 |
| Example 700 | 0.3 | 0.7 | 1.18E−03 | 2.67E+00 |
| Example 701 | 0.2 | 0.8 | 3.63E−03 | 1.64E+00 |
| Example 702 | 0.1 | 0.9 | 1.69E−02 | 1.17E+00 |

Each of Tables 81 and 82 above shows result data when the glass fiber bundle has widths of 24 mm and 12 mm under the conditions that the polycarbonate resin has a penetration pressure of 5.0 atm, a zero-shear rate viscosity of 100 Pa·s, and a Power-law index of 0.9. It can be seen in the case of the glass fiber bundle having a width of 24 mm that the complete penetration time exceeds 6 seconds when the porosity is 0.4 or less, whereas the complete penetration time is within 4.63 seconds when the porosity is 0.5 or more. It can be seen in the case of the glass fiber bundle having a width of 12 mm that the complete penetration time exceeds 6 seconds when the porosity is 0.5 or less, whereas the complete penetration time is within 4.79 seconds when the porosity is 0.6 or more.

What is claimed is:

1. A method for manufacturing a long fiber composite using an apparatus for manufacturing a long fiber composite, the apparatus including a container for containing a resin, a roller which is disposed inside the container and rotates in one direction, a draw-out part for applying a tension to a fiber bundle and moving the fiber bundle in one direction wherein the fiber bundle has porosity, and a resin supply part which is connected to bottom of the container and for supplying the resin into the container,
   wherein the roller includes a first roller and a second roller which are spaced apart from each other,
   the method comprising the steps of:
   a supply step of supplying the resin from the bottom of the container upwardly into the container at a preset pressure by the resin supply part;
   a moving step of moving the fiber bundle positioned on the roller in one direction by the draw-out part; and
   an impregnation step of penetrating the resin supplied into the container into the porosity of the fiber bundle wherein the resin is pulled up to the fiber bundle located on the first roller and the second roller by rotation of the first roller and the second roller so that the resin is penetrated into the fiber bundle,
   wherein the fiber bundle is partially impregnated with only one surface in contact with the resin by controlling an amount of the resin penetrated by the first roller,
   wherein penetration pressure is 0.3 to 5.5 atmospheric pressures (atm),
   wherein the resin is a non-Newtonian resin having a power law index of 0.25 to 0.92, and
   wherein the impregnation step is controlled according to the following Equation 1:

$$V_0^n = \frac{K_y}{\mu_{eff}} \frac{\Delta P}{L} \qquad \text{[Equation 1]}$$

wherein $V_o$: average velocity of the resin penetrated into the fiber bundle, n: power law index of the resin, $K_y$: transverse permeability, $\mu_{eff}$: effective viscosity, $\Delta P$: penetration pressure of the resin into the fiber bundle, and L: thickness of the fiber bundle, which is a distance between one surface of the fiber bundle and the other surface thereof.

2. The method of claim 1, wherein the impregnation step comprises a porosity control step of controlling the porosity of the fiber bundle so that a penetration time required for the resin to fill the internal voids of the fiber bundle is a preset time or less.

3. The method of claim 2, wherein the porosity control step comprises a step of controlling a distance between respective fiber units included in the fiber bundle.

4. The method of claim 3, wherein the step of controlling the distance between the respective fiber units included in the fiber bundle is performed by a method of applying a force in a direction perpendicular to a direction of applying a tension to the fiber bundle.

5. The method of claim 3, wherein the step of controlling the distance between the respective fiber units included in the fiber bundle is performed by a method of controlling the amount of the resin that penetrates into the fiber bundle.

6. The method of claim 1, wherein the impregnation step is passing the resin supplied into the container by a preset pressure through between the first roller and the second roller to penetrate it into the fiber bundle.

7. The method of claim 1, wherein the non-Newtonian resin comprises at least one of maleic anhydride, acrylic acid, amine, ester, epoxy, or compounds to which these are chemically bonded.

8. The method of claim 1, wherein the non-Newtonian resin includes at least one of a polypropylene-based resin, a nylon-based resin, a polyethylene-based resin, a polybutylene terephthalate resin, a polyethylene terephthalate resin, or a polyvinyl chloride resin.

9. The method of claim 1, wherein the resin is one in which nanoparticles are dispersed.

10. The method of claim 9, wherein the nanoparticles include at least one of nanoclay particles, cellulose nanofiber particles, carbon nanoparticles, zinc sulfide nanoparticles, or silver nanoparticles.

11. The method of claim 1, wherein the fiber bundle is at least one of glass fiber filaments, carbon fiber filaments, basalt fiber filaments, aramid fiber filaments, spectra fiber filaments, natural fiber filaments, or mixed filaments thereof.

12. The method of claim 1, wherein the long fiber composite has thermoplastic properties.

* * * * *